United States Patent [19]

Ito

[11] Patent Number: 5,748,223
[45] Date of Patent: May 5, 1998

[54] IMAGE WRITING APPARATUS HAVING A MULTI-BEAM SCANNING OPTICAL SYSTEM FOR IMPROVING THE QUALITY OF REPRODUCED IMAGES

[75] Inventor: Masao Ito, Ebina, Japan

[73] Assignee: Fuji Xerox Co., Ltd., Tokyo, Japan

[21] Appl. No.: 541,699

[22] Filed: Oct. 10, 1995

[30] Foreign Application Priority Data

Apr. 20, 1995 [JP] Japan ................................. 7-094898

[51] Int. Cl.$^6$ ................................................. B41J 2/47
[52] U.S. Cl. ................................. 347/241; 347/243
[58] Field of Search ............................. 347/213, 256, 347/259, 241, 238

[56] References Cited

U.S. PATENT DOCUMENTS

| | | | |
|---|---|---|---|
| 4,295,145 | 10/1981 | Latta | 347/255 |
| 5,233,367 | 8/1993 | Curry | 347/243 |
| 5,305,022 | 4/1994 | Ota et al. | 347/233 |

FOREIGN PATENT DOCUMENTS

| | | |
|---|---|---|
| 62-146067 | 6/1987 | Japan . |
| 1-92772 | 4/1989 | Japan . |
| 2-308185 | 12/1990 | Japan . |
| 5-53068 | 3/1993 | Japan . |

OTHER PUBLICATIONS

Thornton et al., "Properties of Closely Spaced Independently Addressable Lasers Fabricated by Impurity–Induced Disordering", *Appl. Phys. Lett.* 56 (17), Apr. 1990, pp. 1623–1625.

Ito et al., "Multi Beam Scanning Optics by a Laser Diode Array and Interlaced Scanning", *Optics*, vol. 23, Aug. 1994, pp. 492–497.

Dooley et al., "Noise Perception in Electrophotography", *Journal of Applied Photographics Engineering*, vol. 5, No. 4, Fall 1979, pp. 190–196.

*Primary Examiner*—Mark J. Reinhart
*Attorney, Agent, or Firm*—Oliff & Berridge, PLC

[57] ABSTRACT

An image writing apparatus has improved performance of image reproduction based on a multi-beam scanning optical system, in which the number of laser beams n and the spacing of scanning lines p meet the condition: $1/(n \cdot p) \geq 4$ line pairs per millimeter. The optical system is further designed such that the number of deflection planes q of the deflector, a natural number m, where the period of repetitive patterns of image in the slow scan direction is equal to p multiplied by m, and the least common multiple E of m and n, or the least common multiple G of m, n and q meet the condition:

$1/(E \cdot p) \geq 4$ or $1/(G \cdot p) \geq 4$ line pairs per millimeter.

8 Claims, 23 Drawing Sheets

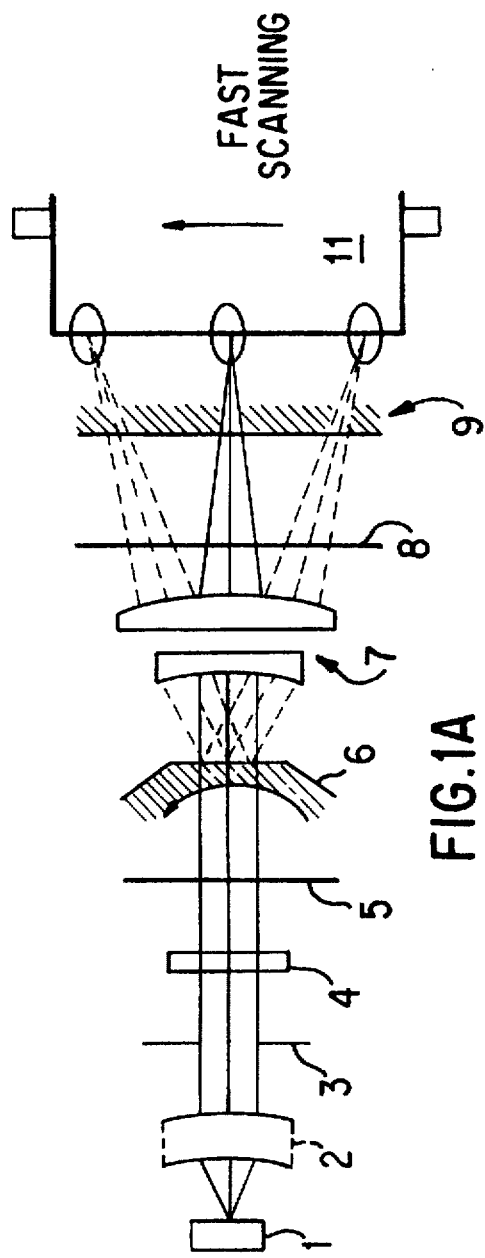
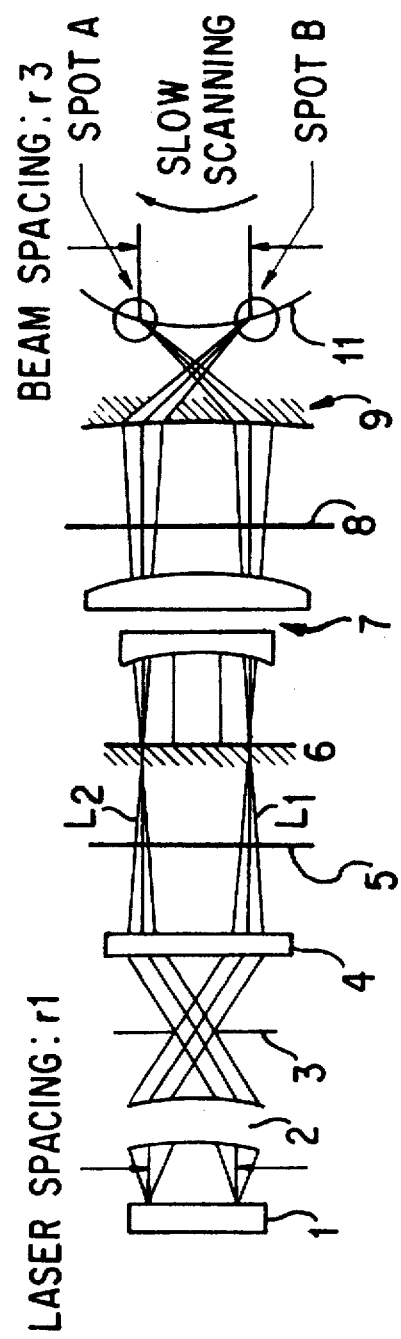
FIG.1A
FIG.1B

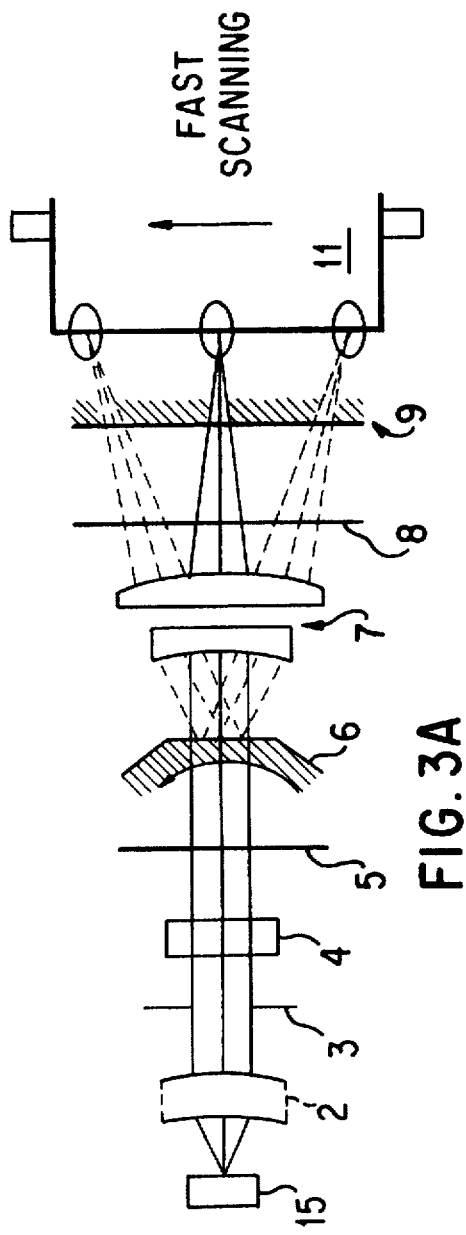
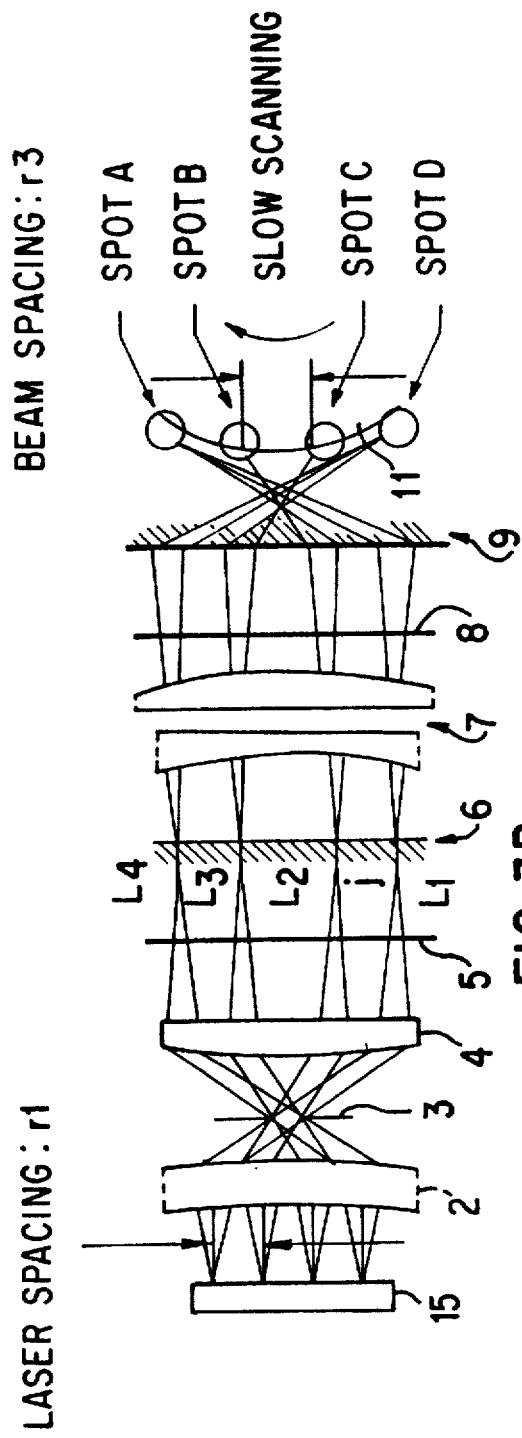

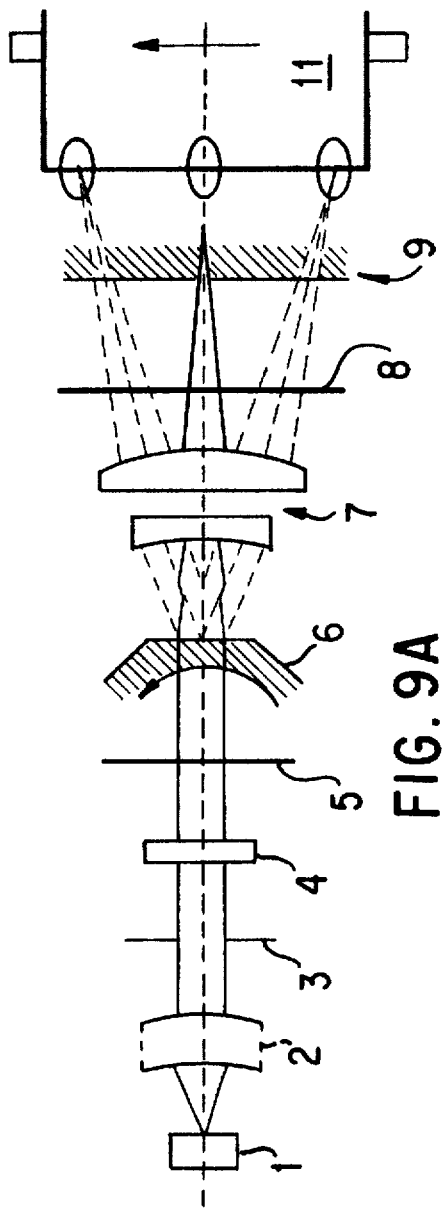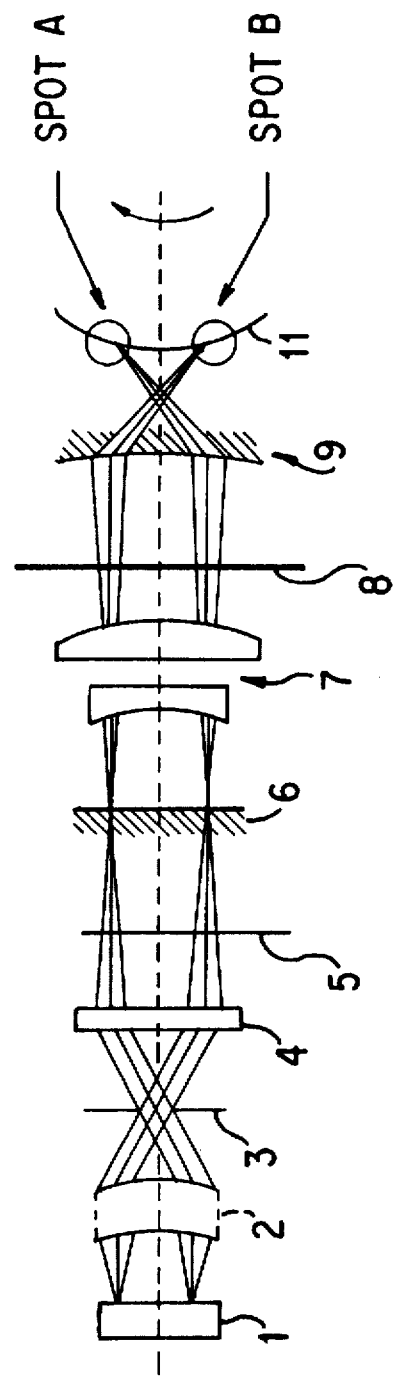

INTERFACE SCANNING PERIOD: i

| | 9 | 8 | 7 | 6 | 5 | 4 | 3 | 2 | 1 | |
|---|---|---|---|---|---|---|---|---|---|---|
| | X | O | O | X | O | O | X | O | — | 9 |
| | O | X | O | X | O | X | O | X | — | 8 |
| | O | O | X | O | O | O | O | O | — | 7 |
| | X | X | O | X | O | X | X | X | — | 6 |
| | O | O | O | O | X | O | O | O | — | 5 |
| | O | X | O | X | O | X | O | X | — | 4 |
| | X | O | O | X | O | O | X | O | — | 3 |
| | O | X | O | X | O | X | O | X | — | 2 |
| | X | X | X | X | X | X | X | X | — | 1 |
| | 9 | 8 | 7 | 6 | 5 | 4 | 3 | 2 | 1 | |

○ COMBINATIONS OF n AND i THAT ENABLE INTERFACE SCANNING

NUMBER OF BEAMS: n

FIG. 14

IMAGE WRITING APPARATUS HAVING A MULTI-BEAM SCANNING OPTICAL SYSTEM FOR IMPROVING THE QUALITY OF REPRODUCED IMAGES

BACKGROUND OF THE INVENTION

The present invention relates to an image writing apparatus, such as a digital copy machine or laser beam printer, using a laser beam scanning optical system for writing image data with a laser beam(s), and particularly to an image writing apparatus having a multi-beam scanning optical system for writing image data with multiple laser beams.

FIG. 8 is a diagram explaining a conventional multi-beam laser scanning device used for the laser beam writing device of an image writing apparatus, and it is disclosed in Japanese patent publication JP-A-Hei-5-53068. FIGS. 9A and 9B are plan view and side view of the multi-beam scanning optical system of this device for writing two lines of image data simultaneously on the scanning plane with two laser beams. FIG. 10 is a cross-sectional diagram of the semiconductor multi-beam laser array used for this multi-beam scanning optical system.

The semiconductor multi-beam laser array 1 shown in FIG. 10 is an LD array of monolithic structure having two semiconductor lasers which can be driven independently, and it is already known as described in publication: R. Thornton, W. Mosby, R. Donaldson, and T. Paoli, "Properties of closely spaced independently addressable lasers fabricated by impurity-induced disordering", Appl. phys. Lett. 56(17), 23, April 1990, pp. 1623–1625, or in Japanese patent publication JP-A-Hei-2-308185.

The semiconductor lasers of this LD array are driven separately by independent video interface circuits and LD drivers in response to video signals as shown in FIG. 11. These circuits are already known as describe in Japanese patent publication JP-A-Sho-62-146067 for example.

The laser array 1 includes a photodiode (not shown), which detects the output light level of the laser array and sends the signal to the control circuit (not shown), by which the light level of laser beams is controlled. Photodiodes useful for the detection of the light level of laser array are described in Japanese patent publication JP-A-Hei-2-308185 and Japanese Patent Publication Hei-5-53068.

In FIGS. 9A and 9B, the laser array 1 emits laser beams L1 and L2, which are treated by a multi-beam scanning optical system including a collimator lens 2, an aperture 3 which limits the diameter of the beams from the collimator lens 2, a cylindrical lens having the optical power only in the subordinate scanning direction, a mirror 5, a laser beam deflector (polygon scanner or rotary polygonal mirror) 6, an f-θ lens 7, a mirror 8, and a cylindrical mirror 9. The resulting laser beams are used to scan the surface, i.e., scanning surface, of a photosensitive drum 11 which rotates around its central axis.

Scanning of the beams by the rotation of the laser beam deflector 6 is called "fast scanning" or "fast scan", and scanning of the beams by the movement of the scanning surface in the direction orthogonal to the fast scan direction is called "slow scanning" or "slow scan".

Disposed at the position near the end the photosensitive drum 11 are a mirror 12 and optical sensor 13 for detecting the scanning beams, and the image signal has its timing of application to the laser array 1 established by the beam position detect signal (SOS signal) produced by the optical sensor 13.

FIG. 12 shows the positions of light spots A and B formed by the laser beams L1 and L2 on the scanning surface 11 in the scanning write operation of the multi-beam scanning optical system. In the figure, the two spots A and B have a scanning line spacing r3 and a scanning line width (scanning pitch) p, and a natural number i which is calculated as r3/p is defined to be "interlace-scanning period". Shown in FIG. 12 is the case of the number of laser beams n equal to 2, and the interlace-scanning period i equal to 1. Indicated by A1 and B1 are the positions of the spots A and B in the slow scan direction at the first scanning (scan number 1). A2 and B2 are the spot positions at the second scanning (scan number 2), and generically Aj and Bj are the spot positions at the j-th scanning (scan number j).

At the 0-th scanning with scan number 0, spots A0 and B0 formed by the first and second laser beams scan the 1-st and 2-nd lines simultaneously, and subsequently spots A1 and B1 formed by the first and second laser beams scan the 3-rd and 4-th lines simultaneously for scan number 1. In this manner, lines are scanned in pairs successively for scan numbers 2, 3, 4 and so on.

FIG. 13 shows the case of the interlace-scanning period i equal to 3, i.e., two spots A and B have a spacing r3 set to be three times the scanning pitch p, in which spots A0 and B0 formed by the first and second laser beams scan the 1-st and 4-th lines simultaneously for scan number 0, and subsequently spots A1 and B1 formed by the first and second laser beams scan the 3-rd and 6-th lines simultaneously for scan number 1. In this manner, the first and second laser beams scan simultaneously the 5-th and 8-th scanning lines, the 7-th and 10-th scanning lines, the 9-th and 12-th scanning lines, and so on for scan numbers 2, 3, 4 and so on successively.

Although the conventional multi-beam scanning device explained above on FIG. 12 and FIG. 13 is the case of two laser beams, interlace-scanning based on multiple laser beams is generally feasible for an arbitrary number of laser beams n and interlace-scanning period i, provided that n and i are prime natural numbers with each other, i.e., n and i do not have a common divisor other than 1. In fact, multi-beam scanning devices using three or more laser beams are already known.

FIG. 14 lists the permissible combinations of n and i for carrying out the interlace-scanning, and it is described in publication: Ito et al. "Multi-beam scanning optics by a laser diode array and interlace scanning", KOGAKU, Vol. 23 (1994), pp. 492–497. FIG. 15 shows another example of interlace-scanning based on four laser beams, and it is described in the same publication.

In a multi-beam scanning optical system using an LD array, the beam spots A and B formed on the scanning surface 11 by the laser beams L1 and L2 have their spacing r3 in the slow scan direction determined from the distance r1 between the light emission points of the LD array and the lateral magnification in slow scan direction of the optical projection system.

However, the light emission point distance r1 of the LD array can easily fluctuate among products due to the limited fabricating accuracy, and the lateral magnification of the optical system also fluctuates due to the limited fabricating accuracy and by the temperature-causing variation of lens power. On this account, the spacing of the light spots A and B on the scanning surface 11 has error of δy in the slow scan direction. FIG. 16 shows the positional error of scanning lines when the spacing of beams decreases by δy, and this error creates the unevenness of exposure of the scanned image, resulting in a degraded image quality.

The laser beam scanning optical system based on multiple beams does not create the unevenness of exposure if there is no deviation of light spots as shown by dashed circles A and solid circles B in FIG. 17 in the slow scan direction (up-down direction in FIG. 17) and in the fast scan direction (right-left direction in FIG. 17). Otherwise, if multiple beams aligning in the slow scan direction have different positions in the fast scan direction as shown by solid spots A and B in FIG. 17, the unevenness of exposure arises in the scanned image, resulting in a degraded image quality. The reason will be explained later in connection with formulas (8) and (9).

It is known for a scanning optical system having a deflector that the difference in the scanning speed of laser beam among the scanning planes of deflector causes the beam exposure position to fluctuate periodically, and this also deteriorates the image quality.

The deterioration of image quality attributable to the above-mentioned causes is particularly pronounced in producing halftones based on the dot pattern or line screen and in reproducing an image having repetitive patterns. Although there is an attempt for the improvement of the reproduction of halftone images by having a repetition period m of dot patterns in the slow scan direction set equal to a multiple of the number of beams n, as described in Japanese patent publication JP-A-Hei-1-92772, it is limited in the type of dot pattern and it does not consider the interlace-scanning.

As mentioned above, there are many publications which describe multi-beam scanning optical systems used for image writing apparatus. However, there are few practical and commercially-available apparatus, and only recently a model of apparatus using two laser beams which scan adjoining tracks simultaneously has been put on the market. A major reason for this situation is that the use of multiple laser beams is liable to the unevenness of exposure distribution and thus the degraded image quality in exchange for an increased image writing speed. Furthermore, the unevenness of exposure worsens in the case of interlace-scanning in which one or more scanning lines are placed between tracks of simultaneous scanning (scanning of i≧2), or when the number of beams of simultaneous scanning is increased.

SUMMARY OF THE INVENTION

The present invention is intended to deal with the foregoing situation, and its prime object is to provide an image writing apparatus having a multi-beam scanning optical system capable of improving the quality of reproduced images.

The inventor of the present invention has studied extensive matters for solving the foregoing technical problems. Initially, the cause of the deviation of laser spot in the slow scan direction was studied. Conceivable causes are as follows.

(1) The error in the spacing of the laser array.
(2) The error in the lateral magnification of the optical system.
(3) The error in the moving speed of the scanning surface in the slow scan direction.

At first, the error of the laser array spacing r1 and the error of the lateral magnification β of the optical system will be explained with reference to FIG. 18.

The spot spacing r3 has error δy due to the error of the lateral magnification of the optical system in the slow scan direction and the error of the spacing of lasers. A spot is located at a position y(j,k) in the slow scan direction, and it is expressed as follows.

$$y(j,k) = p\{(n \cdot j + 1) + i \cdot (k-1)\} \quad (5)$$

where j is an integer indicative of the scanning number, k is a natural number indicative of the beam number ranging 1 to n, and p is equal to r3/i. This formula is reformed as follows.

$$y(j,k) = r3(n \cdot j + 1)/i + r3(k-1) \quad (6)$$

This formula is differentiated for r3 to get the positional error of spot in the slow scan direction as follows.

$$\begin{aligned} \delta y(j,k) &= \delta r3/i\{(n \cdot j + 1) + i \cdot (k-1)\} \\ &= (n \cdot \delta r3/i) \cdot j + \delta r3 \cdot k + \delta r3/i - \delta r3 \end{aligned} \quad (7)$$

Since j and k are variables, the first term of the right side of the formula (7) has error with the period of the number of beams n, and since the second term of the right side of the formula (7) includes a variable k which varies from 1 to n, it also has error with the period of the number of beams n. The third and fourth terms of the right side of the formula (7) are fixed, and therefore the positional error of scanning lines in the slow scan direction varies in the period of the number of beams n.

FIG. 18 shows the exposure pattern in the slow scan direction for n=2 and i=r3/p=3, with r3 having error, and the exposure distribution varies in the period of the number of beams n.

Similarly, FIG. 19 shows the exposure pattern in the slow scan direction for n=2 and i=5, with r3 having error, and the exposure distribution varies in the period of the number of beams n.

Similarly, FIG. 20 shows the exposure pattern in the slow scan direction for n=4 and i=3, with r3 having error, and the exposure distribution varies in the period of the number of beams n.

Similarly, FIG. 21 shows the exposure pattern in the slow scan direction for n=4 and i=5, with r3 having error, and the exposure distribution varies in the period of the number of beams n.

Next, the error of the moving speed of the exposure surface will be explained. In FIG. 22, a spot is located at a position y(j,k) in the slow scan direction, which is expressed as follows.

$$y(j,k) = p\{(n \cdot j + 1) + i \cdot (k-1)\}$$

where j is an integer indicative of the scanning number, and k is a natural number indicative of the beam number ranging 1 to n. The leading spot A with k=1 moves a distance of n·p in each fast scanning. In case there is no error in the spacing of spots of the same fast scanning, the positional error δy(j,k) in the slow scan direction of an arbitrary spot has a value which is independent of k as follows.

$$\delta y(j) = \delta p(n \cdot j + 1 + i \cdot k - i) \quad (8)$$

Since there is no error in the spacing of spots, the formula (8) takes a value which is independent of k, and since j is a variable, the first term of the right side of the formula (8) varies in the period of the number of beams n.

FIG. 23 shows the case of n=2 with the presence of the error of moving speed of the exposure surface, and the positional error δy(j) of spot varies in the period of the number of beams n as in the case of n=4.

Next, the fluctuation of the spot position in the fast scan direction will be explained. FIG. 24 shows the case of n=4 and i=3, in which a spot is located at a position y(j,k) in the slow scan direction, which is expressed as follows.

$y(j,k)=p\{(n \cdot j+1)+i \cdot (k-1)\}$ where j is an integer indicative of the scanning number, and k is a natural number indicative of the beam number ranging 1 to n.

Assuming that a string of spots inclines by an angle of μ with respect to slow scan direction, the deviation δx of spot position in the fast scan direction is as follows.

$$\delta x(j,k) = y(j,k)\tan(u) \quad (9)$$
$$= p\{(n \cdot j + 1) + i \cdot (k-1)\}\tan(u)$$

Since multiple spots have their relative position in the fast scan direction unvaried for all fast scannings, the formula (9) becomes to have only a variable of k as follows.

$$\delta x(k) = pi \cdot (k-1) \tan(u) \quad (10)$$

Since the beam number k is a natural number up to n, the δx(k) varies in the period of the number of beams n.

Next, the case of the presence of error of the light level among multiple beams will be explained. FIG. 25 shows the case of n=4 and i=3. Attention is paid to the spot A with beam number k=1. If the spot A alone has a light level higher than other spots, the exposure distribution on the scanning surface fluctuates. In multi-beam scanning or multi-beam scanning based on interlace-scanning, the beam position moves in the slow scan direction for each fast scanning a distance that is the number of beams n multiplied by the line spacing p, and therefore the spot A repeats the scanning for every fourth track. Namely, a scanning line having a light level error has a period of the number of beams n. Accordingly, the exposure distribution of the scanned image fluctuates in the period of the number of beams n irrespective of the parameter of interlace-scanning.

In the case of different profiles (shapes) among multiple spots, the exposure distribution of the scanned image also fluctuates in the period of the number of beams n irrespective of the parameter of interlace-scanning, as in the case of the presence of light level error among multiple beams.

The foregoing study revealed that all of the following items (items that adversely affect the image quality, i.e., items that cause the exposure distribution to vary) with regard to multi-beam interlace-scanning have the fluctuation in the period of the number of beams n.

(1) The error in the laser array spacing r1, and the positional error of scanning lines in the slow scan direction attributable to the error of the lateral magnification β of the optical system.

(2) The positional error of spots in the slow scan direction attributable to the error of the moving speed of the exposure surface.

(3) The deviation of spots in the fast scan direction attributable to the inclination of the string of light spots.

(4) The fluctuation of exposure distribution in the slow scan direction attributable to the light level error among the beams.

In regard to the resolution of human eye, there is known a visual transfer function as shown in FIG. 26 which is described in publication: Roger P. Dooly and Rodney Shaw, "Noise perception in electrophotography", Journal of Applied Photographic Engineering, Vol. 5, No. 4, Fall 1979, pp. 190–196. The visual transfer function indicates that it is difficult for the human eye to recognize an image having a spatial frequency above 4 line pairs per millimeter. On this account, by making an image to have a higher spatial frequency than 4 line pairs per millimeter, it is possible to make insensible for the human eye the fluctuation of exposure distribution caused by the use of the foregoing multi-beam scanning optical system, thereby obtaining a substantially high-quality image.

The present invention was completed based on the result of the foregoing studies for improving the quality of reproduced image based on the multi-beam scanning optical system.

In the following explanation on the subject matter of this invention, the reference numerals of constituents used in the explanation of embodiments will be appended to the corresponding items for the sole purpose of facilitating the understanding.

Invention 1

The image writing apparatus based on the first invention comprises a laser array (1,15) including a plurality of laser diodes (LD1–LD4) modulated independently, and a multi-beam scanning optical system having a deflector (6) which deflects a plurality of laser beams (L1–L4) produced by the laser diodes (LD1–LD4) and operating on the laser beams (L1–L4) deflected by the deflector (6) to scan different scanning lines on a scanning surface (11) thereby to write an image on the scanning surface (11), wherein the multi-beam scanning optical system is designed such that the number of laser beams n and the spacing of scanning lines p resulting from the scanning of the laser beams meet the condition of formula:

$$1/(n \cdot p) \geq 4 \text{ line pairs per millimeter} \quad (1)$$

and wherein the multi-beam scanning optical system is designed for interlace-scanning such that the interlace-scanning period i, which is defined to be the spacing of adjoining beams r3 divided by p, and the number of laser beams n are prime natural numbers with each other.

Invention 2

The image writing apparatus based on the second invention is derived from the image writing apparatus of the first invention, wherein the multi-beam scanning optical system is designed such that the interlace-scanning period i is greater than or equal to 2.

Invention 3

The image writing apparatus based on the third invention is derived from the image writing apparatus of the first or second invention, wherein the multi-beam scanning optical system is designed such that the number of laser beams n is greater than or equal to 3.

Invention 4

The image writing apparatus based on the fourth invention is derived from the image writing apparatus of any of the first through third inventions, wherein the multi-beam scanning optical system is designed such that the number of laser beams n, the spacing of scanning lines p resulting from the scanning of the laser beams, a natural number m, where the period of repetitive patterns of image in the slow scan direction is equal to p multiplied by m, and the least common multiple E of m and n meet the condition of formula:

$$1/(E \cdot p) \geq 4 \text{ line pairs per millimeter} \quad (2)$$

Invention 5

The image writing apparatus based on the fifth invention is derived from the image writing apparatus of any of the first through fourth inventions, wherein the multi-beam scanning optical system is designed such that the number of laser beams n, the spacing of scanning lines p resulting from the scanning of the laser beams, the number of deflection planes q of the deflector, and the least common multiple F of n and q meet the condition of formula:

$$1/(F \cdot p) \geq 4 \text{ line pairs per millimeter} \quad (3)$$

Invention 6

The image writing apparatus based on the sixth invention is derived from the image writing apparatus of any of the first through fifth inventions, wherein the multi-beam scanning optical system is designed such that the number of laser beams n, the spacing of scanning lines p resulting from the scanning of the laser beams, the number of deflection planes q of the deflector, a natural number m, where the period of repetitive patterns of image is equal to p multiplied by m, and the least common multiple G of m, n and q meet the condition of formula:

$$1/(G \cdot p) \geq 4 \text{ line pairs per millimeter} \quad (4)$$

According to the first invention arranged as described above, in which the multi-beam scanning optical system is designed to have its parameters n and p determined to meet the condition of formula:

$$1/(n \cdot p) \geq 4 \text{ line pairs per millimeter,}$$

it is feasible to obtain high-quality images with some unevenness of exposure. Namely, a multi-beam scanning optical system which produces high-quality images can readily be designed.

According to the second invention arranged as described above, in which the multi-beam scanning optical system is designed to have its parameters n and p determined to meet the condition of formula:

$$1/(n \cdot p) \geq 4 \text{ line pairs per millimeter,}$$

where the interlace-scanning period i, which is defined to be a natural number that is the spacing of adjoining beams r3 divided by p, is greater than or equal to 2, then it is feasible to obtain high-quality images with some unevenness of exposure. Namely, a multi-beam scanning optical system which produces high-quality images based on interlace-scanning at $i \geq 2$ can readily be designed.

According to the third invention arranged as described above, in which the multi-beam scanning optical system is designed to have its parameters n and p determined to meet the condition of formula:

$$1/(n \cdot p) \geq 4 \text{ line pairs per millimeter,}$$

where the n is greater than or equal to 3, then it is feasible to obtain high-quality images with some unevenness of exposure. Namely, a multi-beam scanning optical system which produces high-quality images even in the case of three or more laser beams can readily be designed.

According to the fourth invention arranged as described above, in which the multi-beam scanning optical system is designed to have its parameters n, p and m determined to meet the condition of formula:

$$1/(E \cdot p) \geq 4 \text{ line pairs per millimeter,}$$

where E is the least common multiple of m and n, and the period of repetitive patterns of image in the slow scan direction is equal to p multiplied by m, then it is feasible to reproduce high-quality halftone images and line images. Namely, by determining the parameters n, p and m to meet the above formula, a multi-beam scanning optical system which produces high-quality halftone images and line images can readily be designed.

According to the fifth invention arranged as described above, in which the multi-beam scanning optical system is designed to have its parameters n, p and q determined to meet the condition of formula:

$$1/(F \cdot p) \geq 4 \text{ line pairs per millimeter,}$$

where F is the least common multiple of n and q, then it is feasible to obtain high-quality images with some unevenness of exposure. Namely, by determining the parameters n, p and q to meet the above formula, a multi-beam scanning optical system which produces high-quality images with some unevenness of exposure can readily be designed.

According to the sixth invention arranged as described above, in which the multi-beam scanning optical system is designed to have its parameters n, p, m and q determined to meet the condition of formula:

$$1/(G \cdot p) \geq 4 \text{ line pairs per millimeter,}$$

where G is the least common multiple of m, n and q, and the period of repetitive patterns of image in the slow scan direction is equal to p multiplied by m, then it is feasible to obtain high-quality halftone images and line images. Namely, by determining the parameters n, p, m and q to meet the above formula, a multi-beam scanning optical system which produces high-quality halftone images and line images can readily be designed.

BRIEF DESCRIPTION OF THE DRAWINGS

FIGS. 1A and 1B are diagrams used to explain the image writing apparatus based on a first embodiment of this invention, showing a plan view and side views, respectively, of the multi-beam scanning optical system;

FIGS. 3A and 3B are diagrams used to explain the image writing apparatus based on a second embodiment of this invention, showing a plan view and side view, respectively, of the multi-beam scanning optical system;

FIGS. 9A and 9B are diagrams used to explain this conventional multi-beam scanning optical system, showing its plan view and side view, respectively;

FIG. 14 is a table listing the combinations of the parameters n and i that enable interlace-scanning;

DESCRIPTION OF THE PREFERRED EMBODIMENTS

The embodiments of this invention will be explained with reference to the drawings.

EMBODIMENT 1

Figure 2:
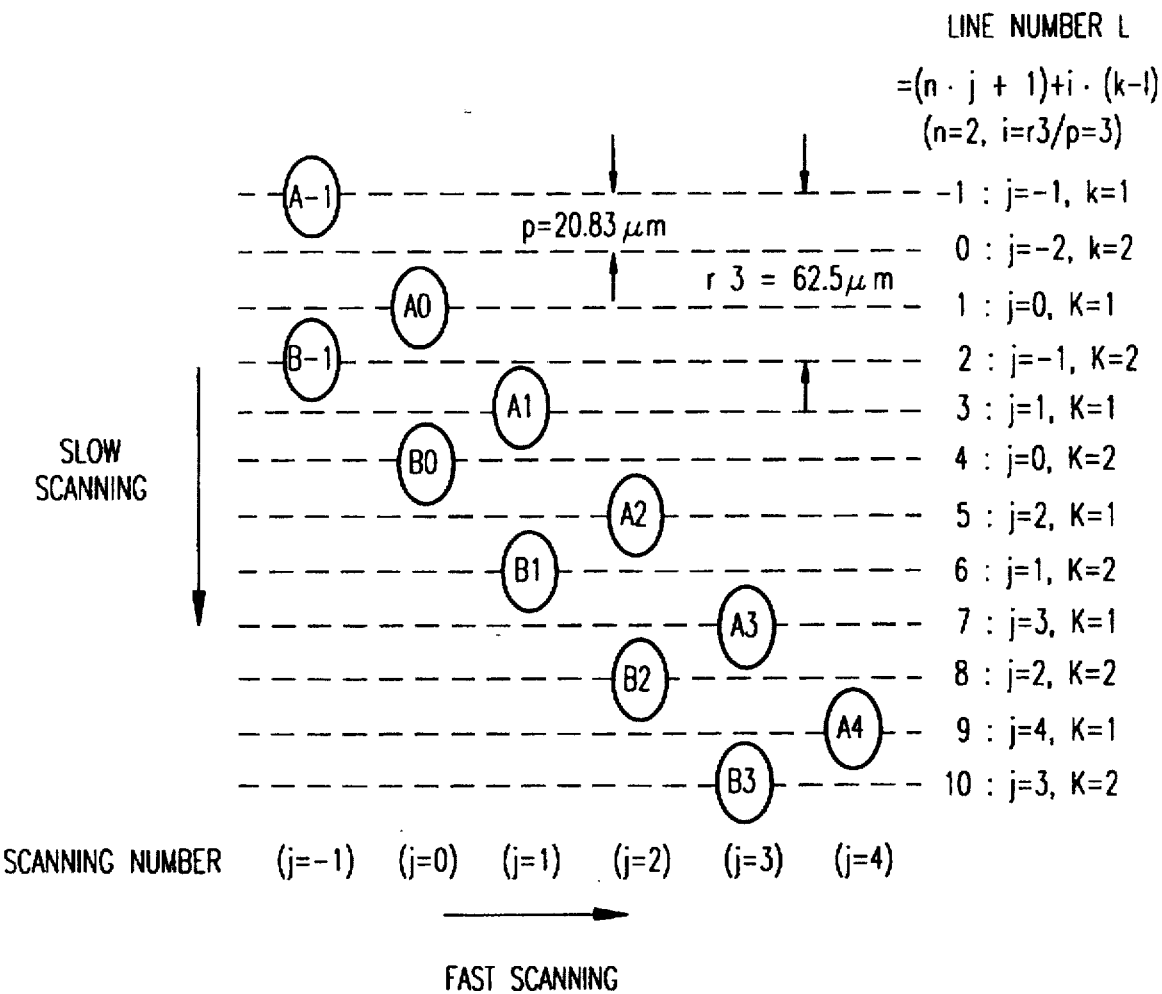
FIG. 2 is a diagram pertinent to the multi-beam scanning optical system of the first embodiment, showing the relation between the laser beam spots and the spacing of scanning lines on the scanning surface in case there is no deviation of spot position.
Figure 5:
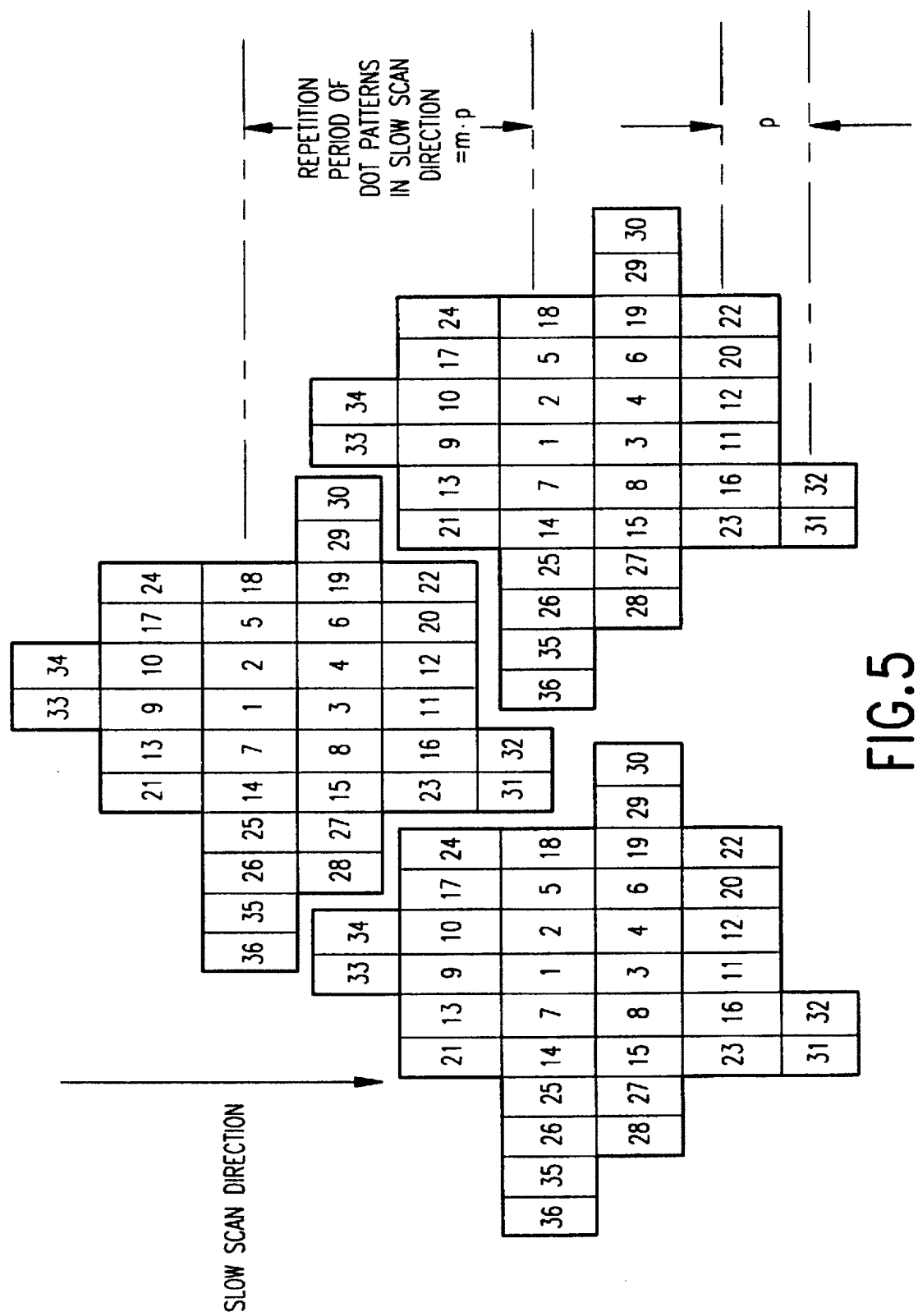
FIG. 5 is a diagram showing dot patterns for producing a halftone image.

FIGS. 1A and 1B are a plan view and side view of the image writing apparatus based on the first embodiment of this invention. The constituents shown in these figures are identical to those shown in FIGS. 9A and 9B, and the laser beam focusing system is also identical. FIG. 2 shows the relation between the laser beam spots and the spacing of scanning lines on the scanning surface based on the multi-beam scanning optical system of this embodiment in case there is no deviation of spot position. FIG. 5 shows dot patterns for producing a halftone image.

Referring to FIG. 1B, a collimator lens 2 has a focal length f1, a cylindrical lens (first optical device of slow scan direction) 4 has a focal length f2, an f-θ lens 7 has a focal length f3, and a cylindrical mirror 9 has a focal length f4. A first scanning optical system made up of the collimator lens 2, aperture 3 and cylindrical lens 4 disposed between a laser array 1 and deflector 6 has a lateral magnification in slow scan direction of β1, and a second scanning optical system including the f-θ lens 7 and cylindrical mirror 9 disposed between the deflector 6 and scanning surface 11 has a lateral magnification in slow scan direction of β2. A multi-beam scanning optical system composed of the first and second optical systems with the lateral magnifications β1 and β2 has a lateral magnification in slow scan direction of β.

Laser diodes LD1 and LD2 have a spacing r1 between their laser beam emitting positions. Laser beams L1 and L2 emitted by the laser diodes LD1 and LD2 go through the first scanning optical system with the lateral magnification β1, and are focused only in the slow scan direction on the deflector 6. The laser beams deflected by the deflector 6 go through the second scanning optical system with the lateral magnification β2, and are focused again on the scanning surface 11.

The multi-beam scanning optical system of this embodiment shown in FIGS. 1A and 1B has its design parameters set to be: r1=14 μm, f1=25.0 mm, f2=201.1 mm, β1=f2/f1=8.042, β2=0.555, β=β1·β2=4.464, r3=r1·β=62.5 μm, and p=20.83 μm.

Accordingly, this multi-beam scanning optical system forms spots A and B of the laser beams L1 and L2 on the scanning surface 11 as shown in FIG. 2. The number of laser beams is two and the interlace-scanning period (i=r3/p) is three, i.e., n=2 and i=3.

The values of n and p of this embodiment meet the condition of formula (1) as follows.

$$1/(n \cdot p) = 1/(2 \times 0.02083)$$
$$= 24.0$$
$$\geq 4 \text{ line pairs per millimeter}$$

Consequently, the image writing apparatus of this embodiment has its unevenness of light level, which is caused by the multi-beam scanning, unnoticed by the human eye, and a high image quality is accomplished.

This embodiment uses a dot pattern as shown in FIG. 5 for displaying toned images. Dot patterns of FIG. 5 have a screen angle of 45° with respect to the slow scan direction and a period of repetition m·p in the slowscan direction, and accordingly m=3.

In a multi-beam scanning optical system, if the beam spacing has error against the design setting, the spacing of scanning lines fluctuates in the repetition period equal to the number of beams n irrespective of the parameter of interlace-scanning, as mentioned previously. On this account, there arise Moire fringes of scanning lines having a period which is dependent on the repetition period of dot patterns in the slow scan direction and the number of beams n. The period of Moire fringes is determined from the least common multiple E of the number of beams n and the value m which determines the repetition of dot patterns in the slow scan direction, irrespective of the parameter of interlace-scanning. In this embodiment, n=2 and m=3, then E=6. Since p=0.02083 mm, this embodiment meets the condition of formula (2) as follows.

$$1/(E \cdot p) = 8.0012$$
$$\geq 4 \text{ line pairs per millimeter}$$

In consequence, when the image writing apparatus of this embodiment is used to display toned images, Moire fringes attributable to the fluctuation of line spacing of multi-beam scanning and the repetition period of dot patterns in the slow scan direction are likely unnoticed by the human eye, and a high image quality is accomplished.

Figure 7:
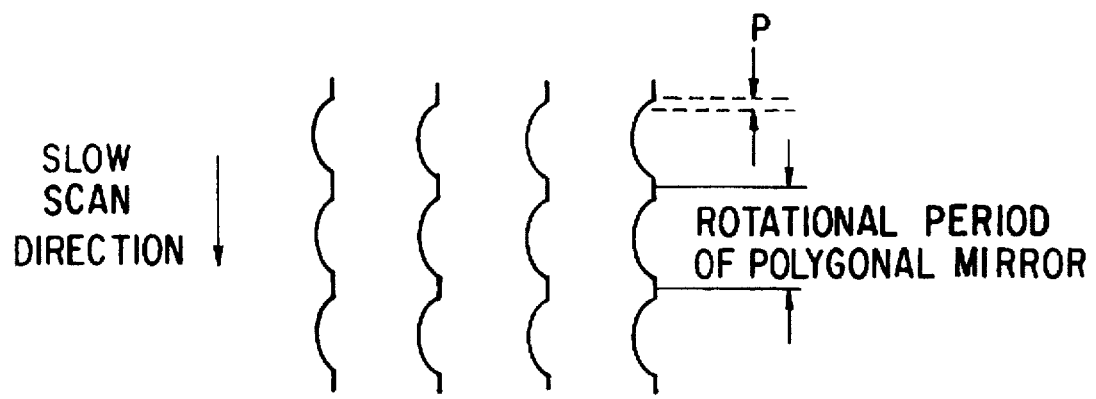
FIG. 7 is a diagram showing the unevenness of exposure distribution caused by the jitter of the deflector in a conventional single-beam scanning optical system.
Figure 8:
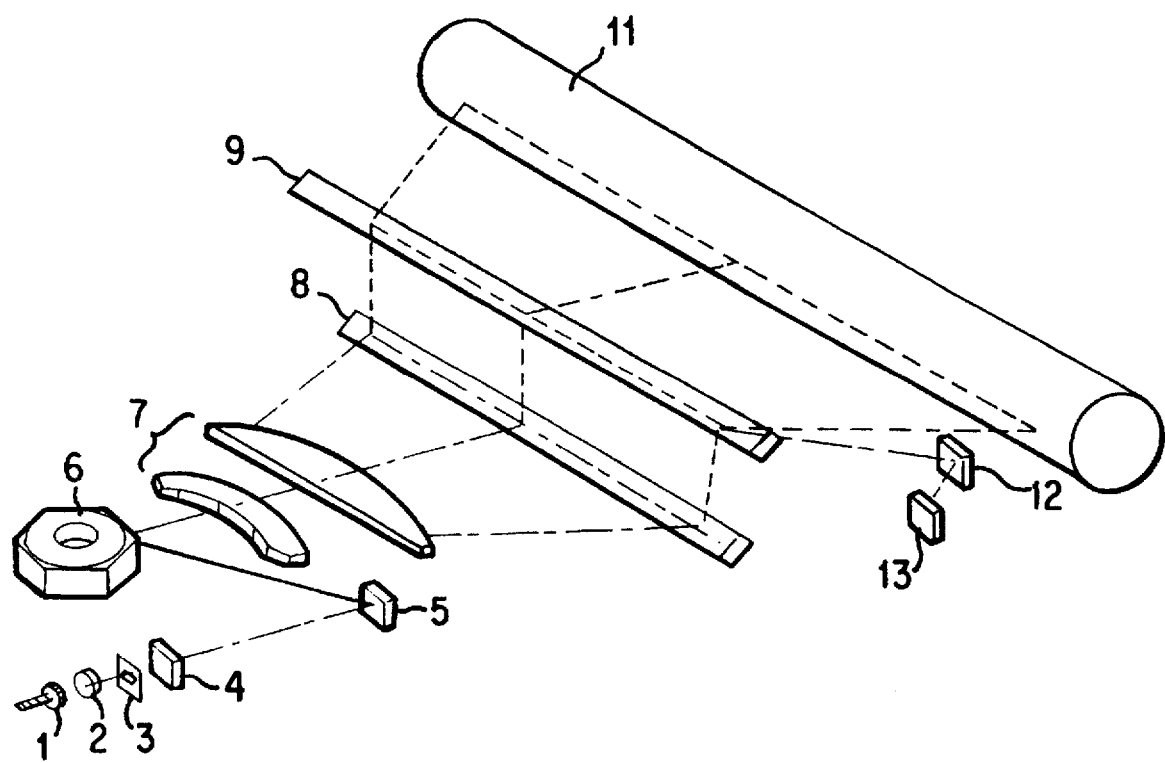
FIG. 8 is a diagram showing a conventional multi-beam scanning optical system.
Figure 10:
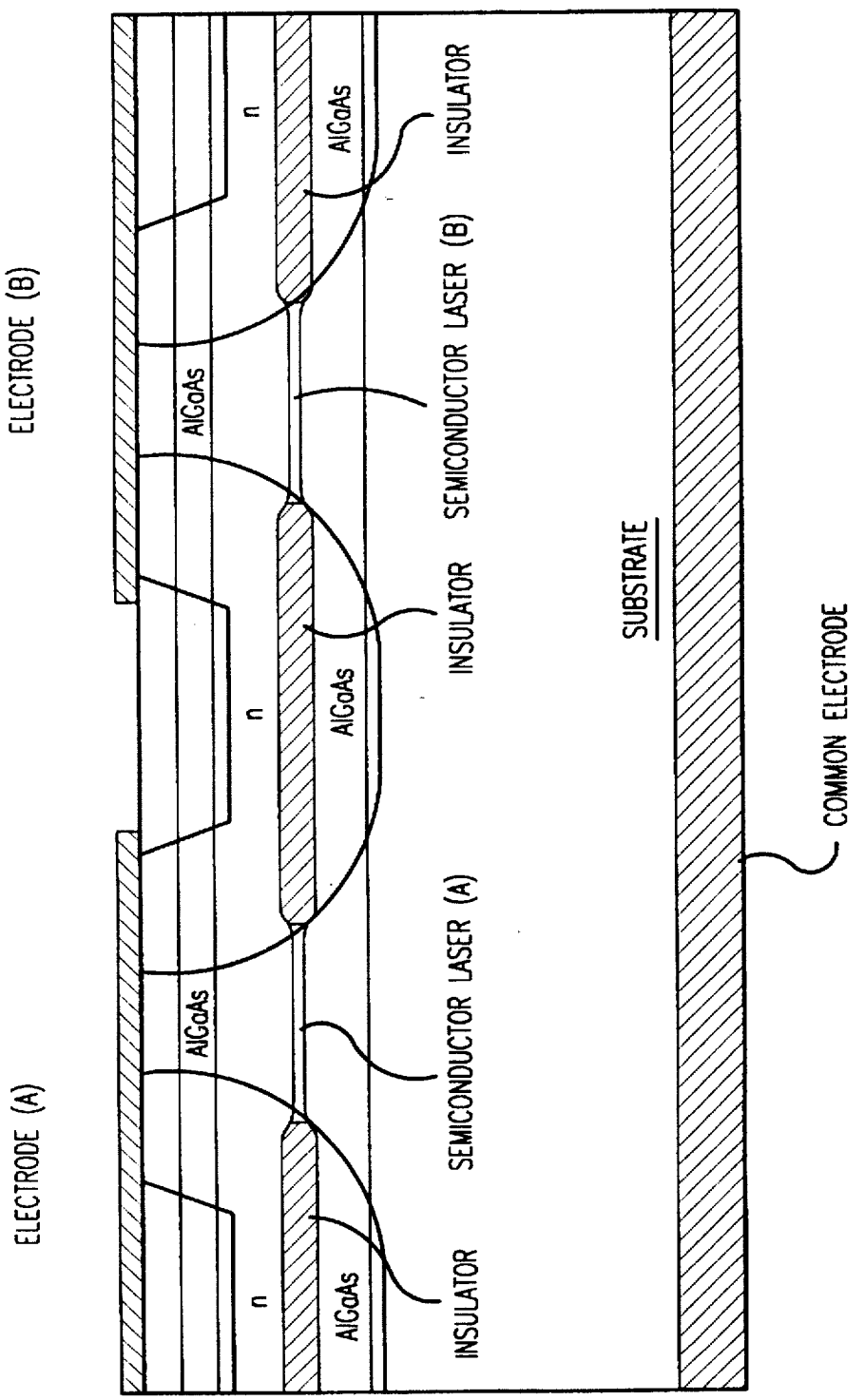
FIG. 10 is a diagram used to explain the light source of laser array of this conventional multi-beam scanning optical system.
Figure 11:
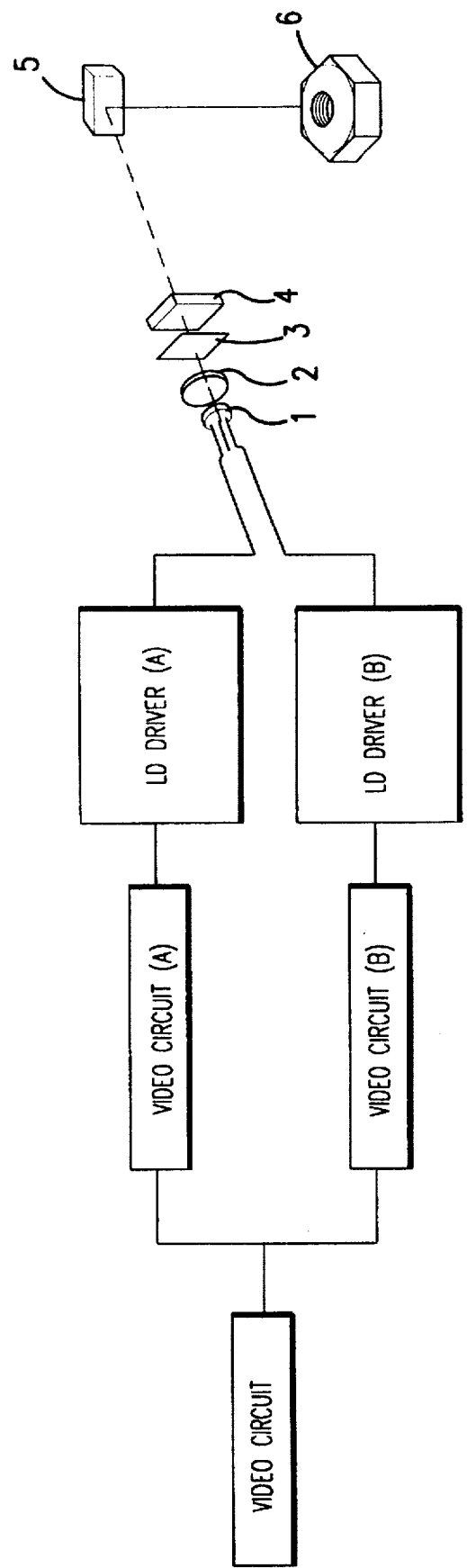
FIG. 11 is a block diagram used to explain the electrical circuits (video circuit and laser drive circuit) associated with this conventional multi-beam scanning optical system.
Figure 12:
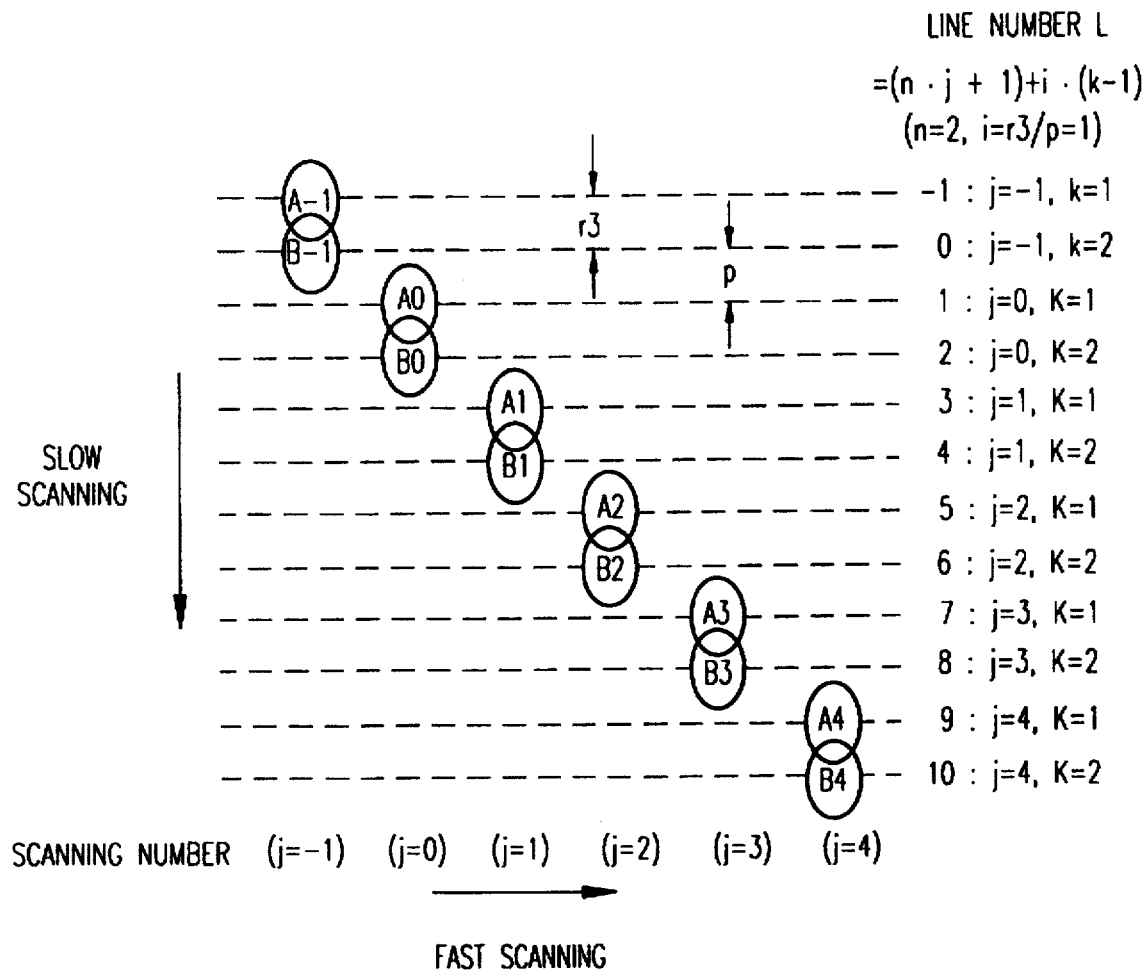
FIG. 12 is a diagram pertinent to a conventional multi-beam scanning optical system, showing the relation between the laser beam spots and the spacing of scanning lines on the scanning surface.
Figure 13:
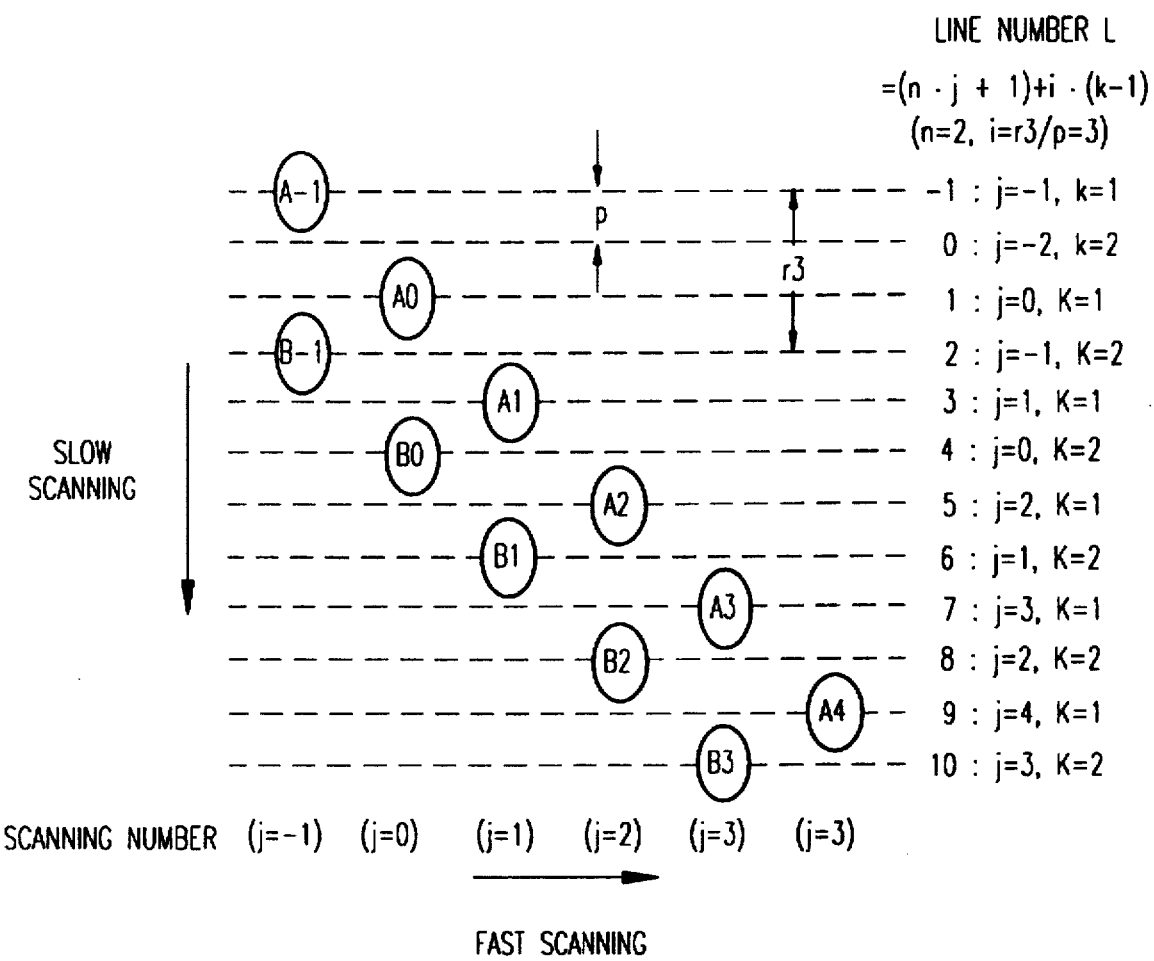
FIG. 13 is a diagram pertinent to another conventional multi-beam scanning optical system, showing the relation between the laser beam spots and the spacing of scanning lines on the scanning surface.
Figure 15:
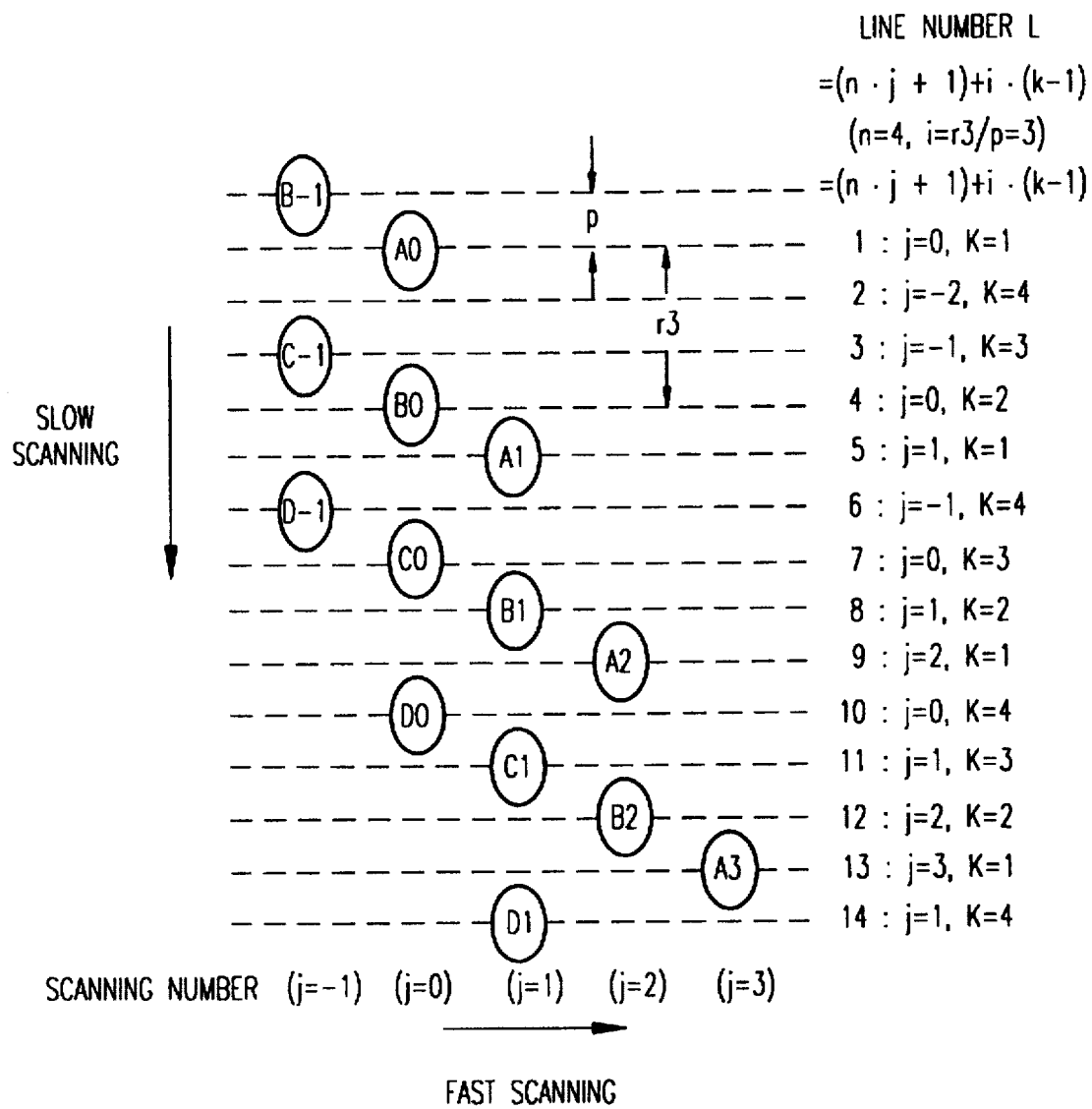
FIG. 15 is a diagram pertinent to still another conventional multi-beam scanning optical system, showing the relation between the laser beam spots and the spacing of scanning lines on the scanning surface.
Figure 16:
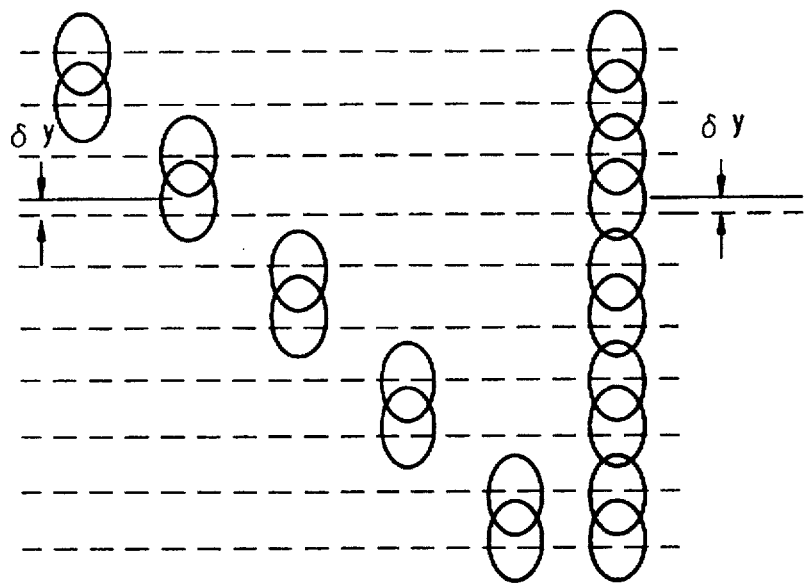
FIG. 16 is a diagram pertinent to a conventional multi-beam scanning optical system, showing the positional error in the slow scan direction of the laser beam spot on the scanning surface.
Figure 17:
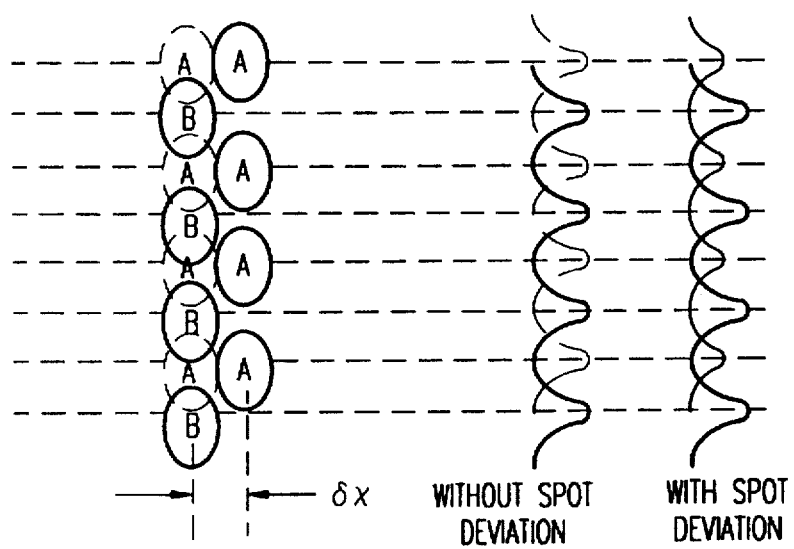
FIG. 17 is a diagram pertinent to a conventional multi-beam scanning optical system, showing the positional error in the fast scan direction of the laser beam spot on the scanning surface.
Figure 18:
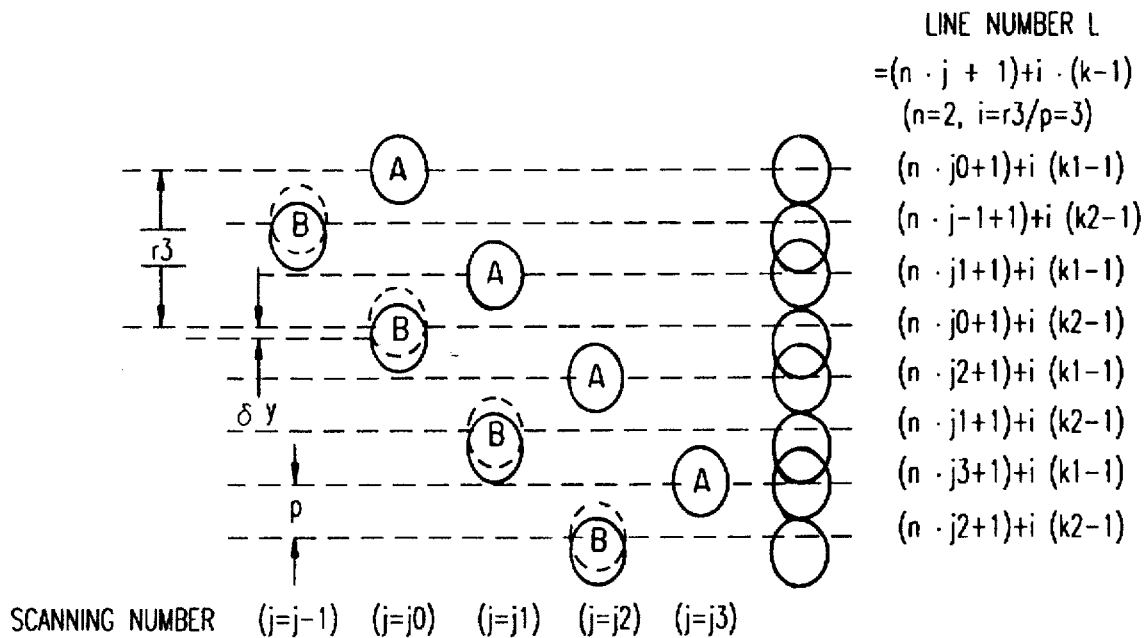
FIG. 18 is a diagram pertinent to a multi-beam scanning optical system having parameters of n=2 and i=3, showing the unevenness of exposure distribution in the slow scan direction in case the spot spacing on the scanning surface has error against the design setting.
Figure 19:
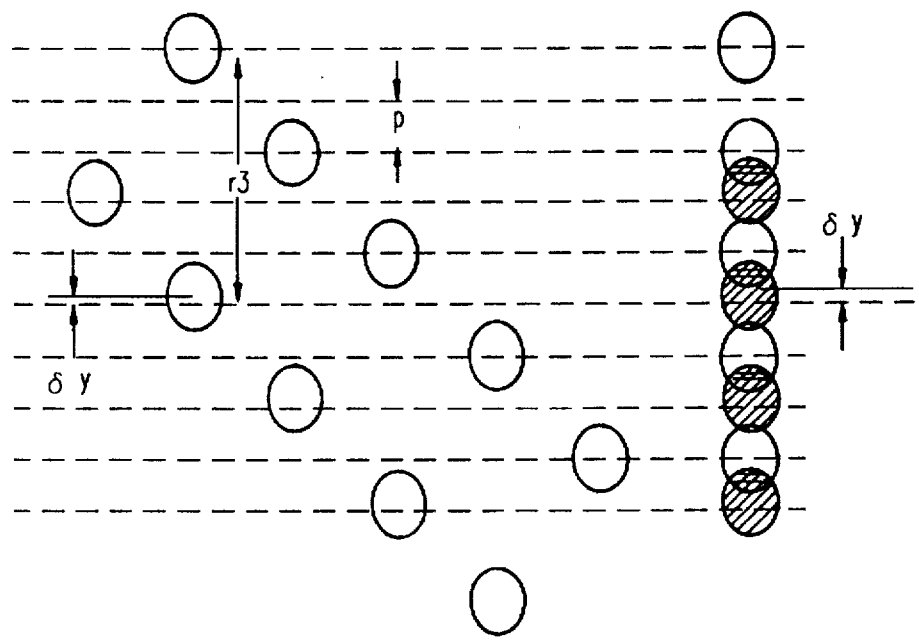
FIG. 19 is a diagram pertinent to a multi-beam scanning optical system having interlace-scanning parameters of n=2 and i=r3/p=5 that are different from those of the multi-beam scanning optical system of FIG. 18, showing the unevenness of exposure distribution in the slow scan direction in case the spot spacing on the scanning surface has error against the design setting.
Figure 20:
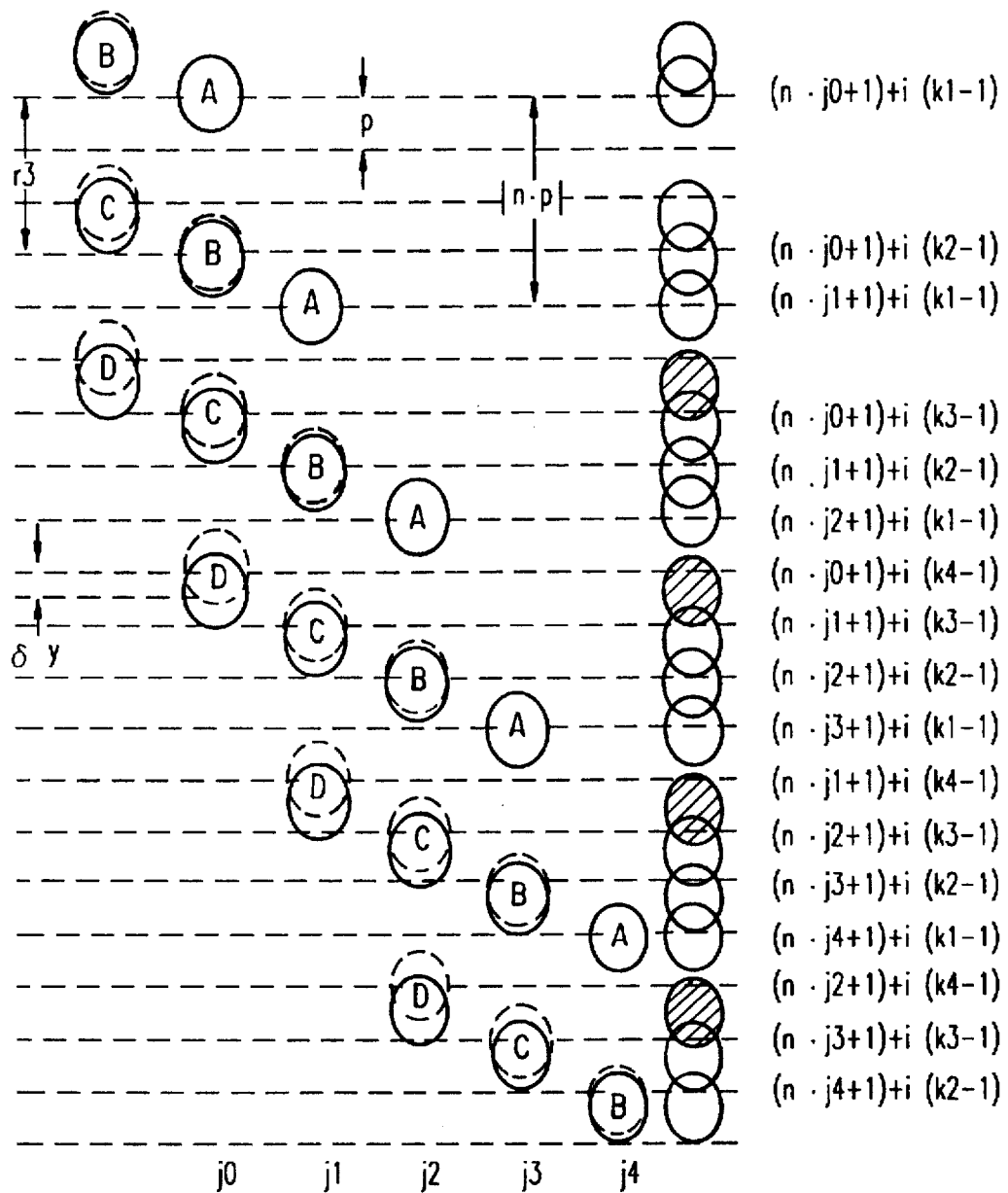
FIG. 20 is a diagram pertinent to a multi-beam scanning optical system, showing the unevenness of exposure distribution in the slow scan direction in case the spot spacing on the scanning surface has error against the design setting.
Figure 21:
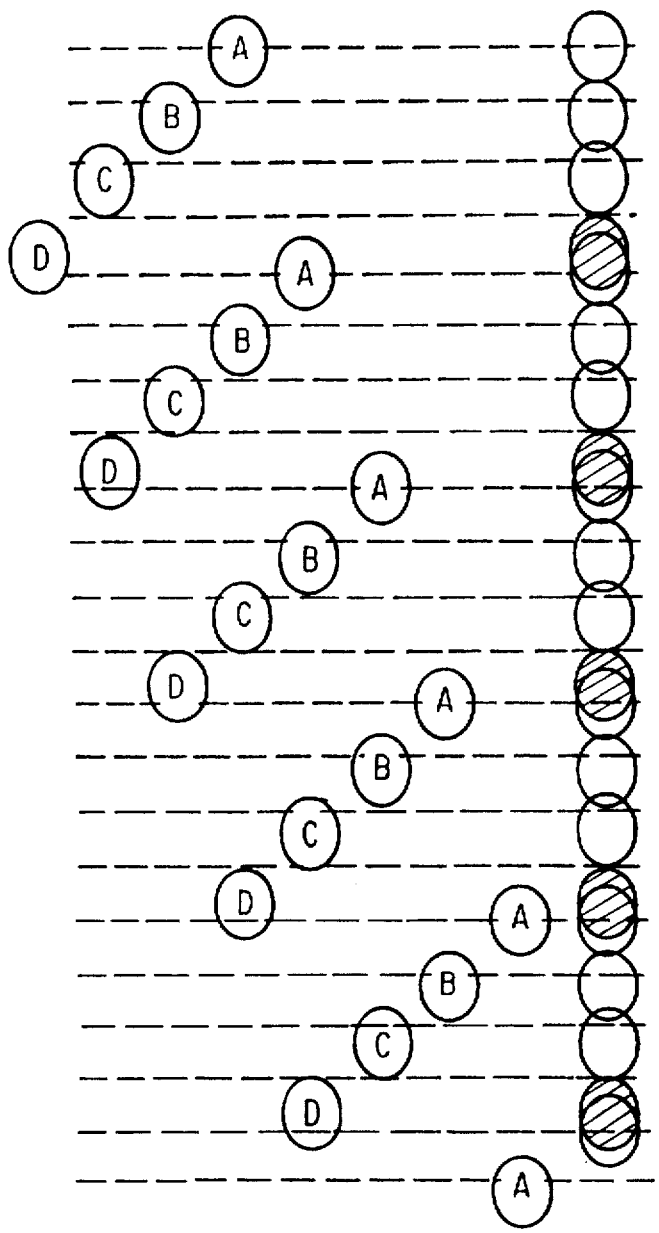
FIG. 21 is a diagram pertinent to a multi-beam scanning optical system having interlace-scanning parameters of n=4 and i=5 that are different from those of the multi-beam scanning optical system of FIG. 20, showing the unevenness of exposure distribution in the slow scan direction in case the spot spacing on the scanning surface has error against the design setting.
Figure 22:
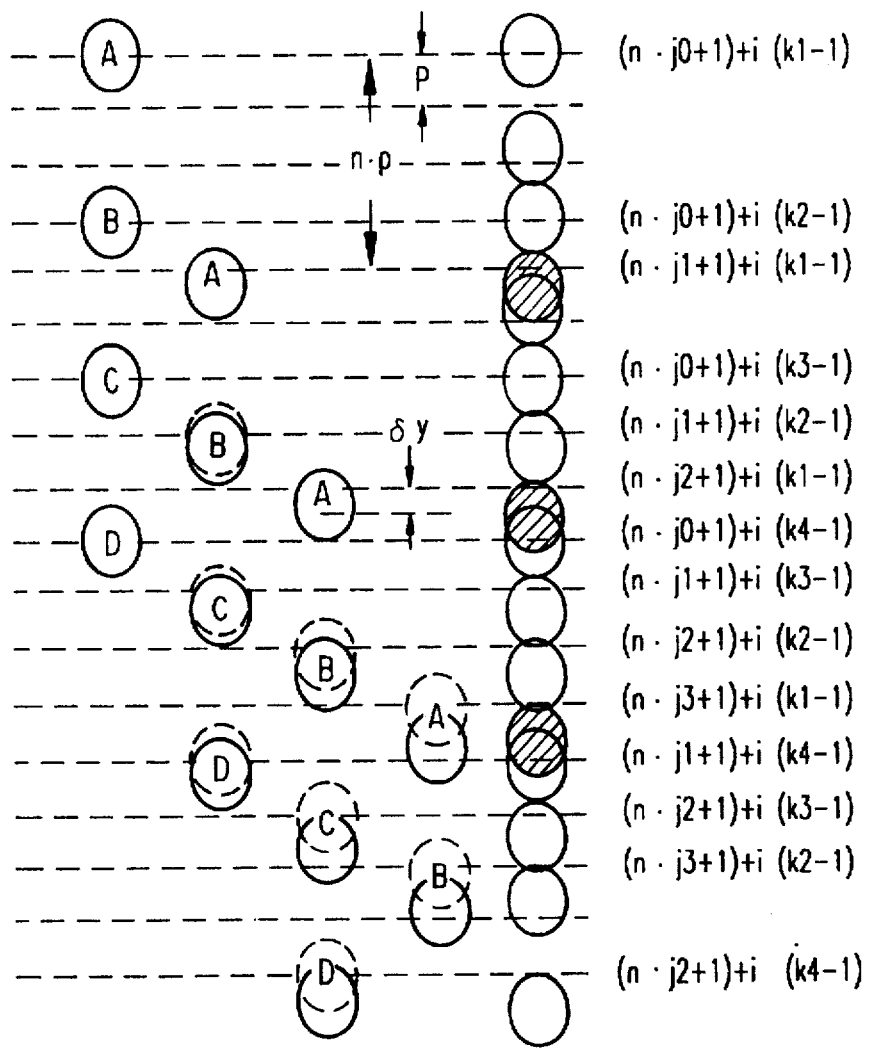
FIG. 22 is a diagram pertinent to a multi-beam scanning optical system, showing the unevenness of exposure distribution in the slow scan direction in case the spot moving distance on the scanning surface has error against the design setting.
Figure 23:
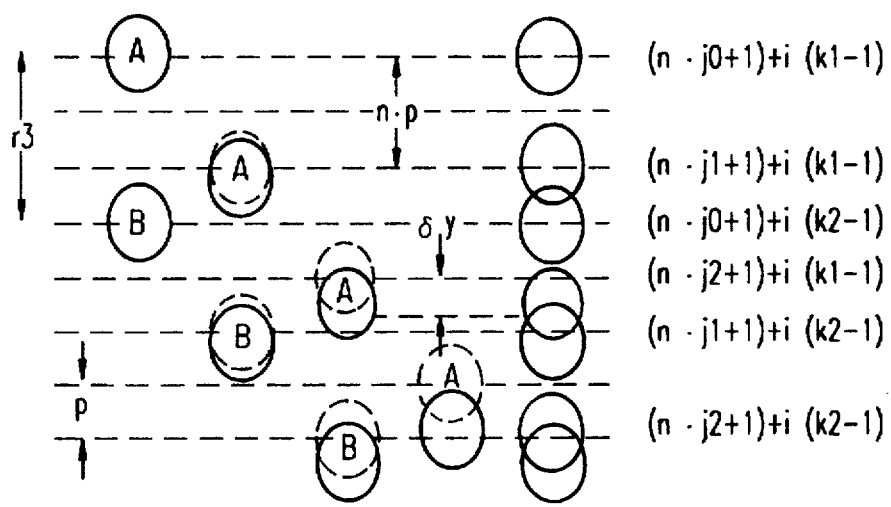
FIG. 23 is a diagram pertinent to a multi-beam scanning optical system having interlace-scanning parameters of n=2 and i=3 that are different from those of the multi-beam scanning optical system of FIG. 22, showing the unevenness of exposure distribution in the slow scan direction in case the spot moving distance on the scanning surface has error against the design setting.
Figure 24:
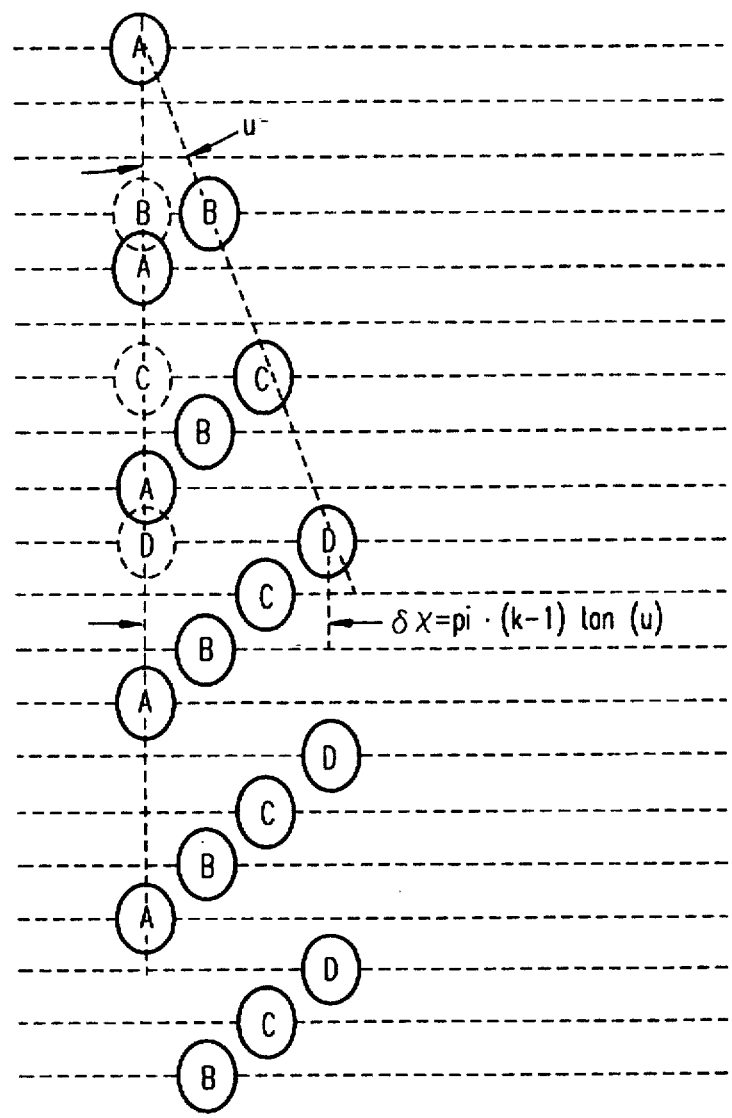
FIG. 24 is a diagram pertinent to a multi-beam scanning optical system, showing the deviation of exposure position in case the laser beam spots on the scanning surface deviate in the fast scan direction.
Figure 25:
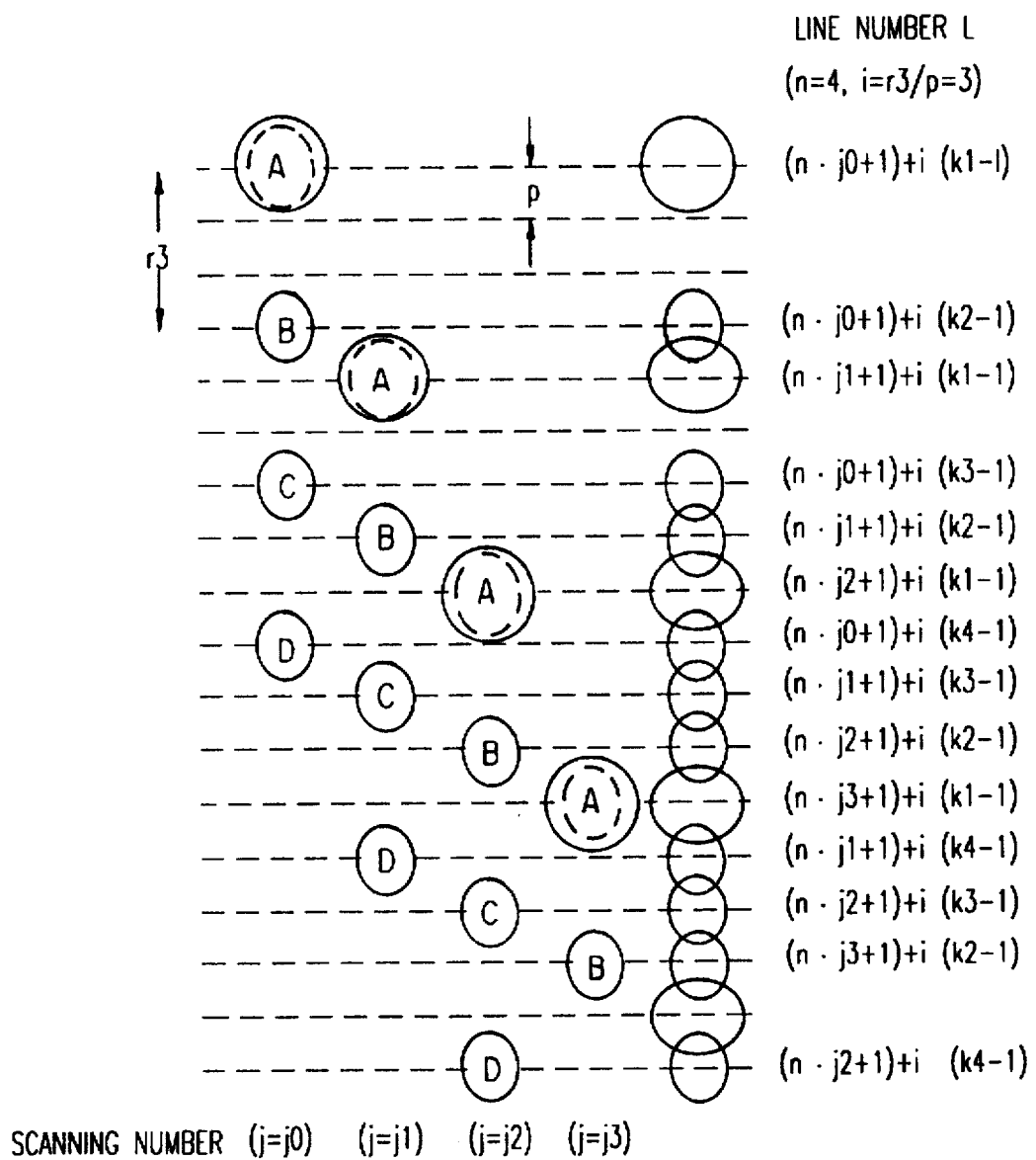
FIG. 25 is a diagram pertinent to a multi-beam scanning optical system, showing the unevenness of exposure distribution in case the light level of laser beam spot on the scanning surface has error against the design setting.
Figure 26:
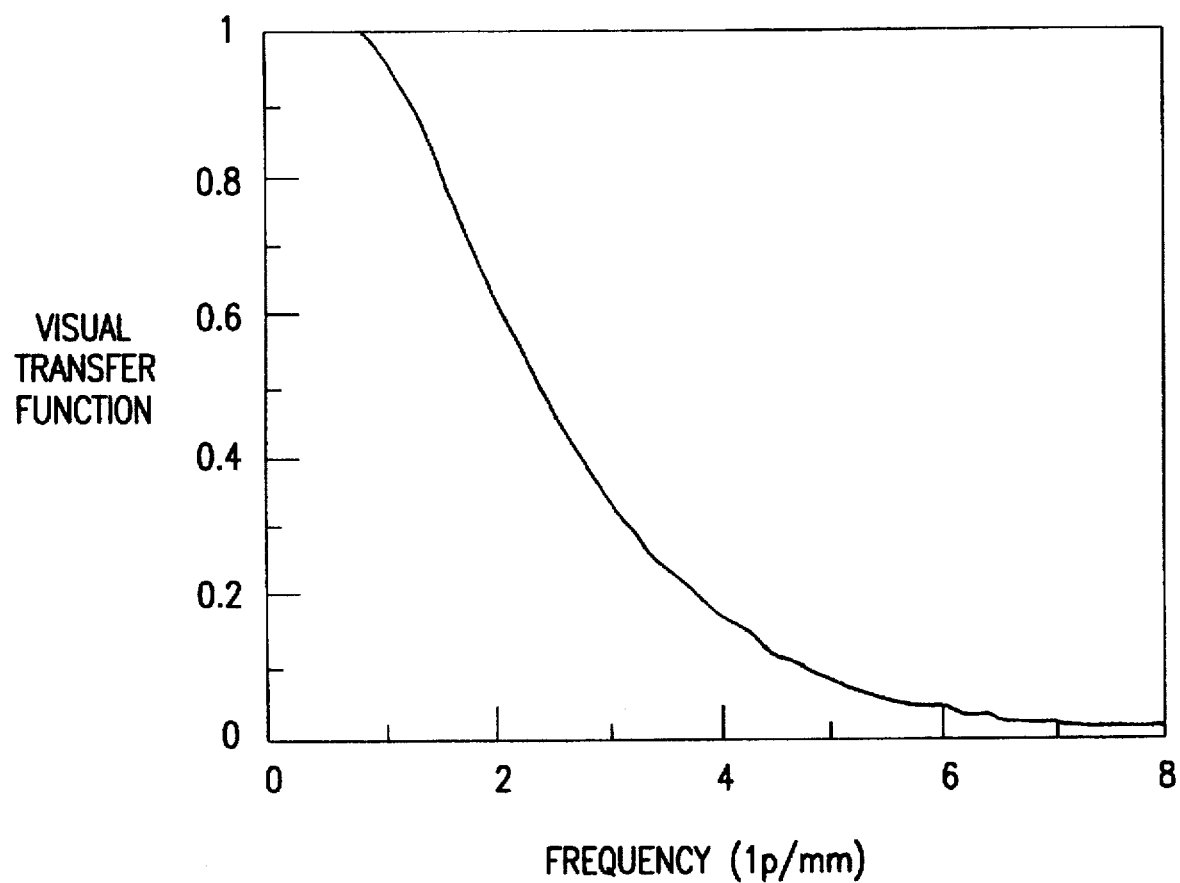
FIG. 26 is a graph showing the visual transfer function of the human eye indicative of the resolution of eye.

The use of a deflector in a laser beam scanning optical system can create a distortion of image due to the fluctuation of beam position in the fast scan direction which is mainly caused by the plane distortion of the mirror. FIG. 7 demonstrates the output line image extending in the slow scan direction resulting from the use of a deflector having a plane distortion in a conventional single-beam scanning optical system. The image position fluctuates in the fast scan direction once every revolution of the polygonal mirror, and this phenomenon is called the deflector-causing jitter.

As mentioned previously, in a multi-beam scanning optical system, if the beam spacing has error against the design setting, the spacing of scanning lines fluctuates in the repetition period equal to the number of beams n irrespective of the parameter of interlace-scanning. This situation gives rise to the emergence of Moire fringes attributable to the jitter of deflector and the fluctuation of scanning line spacing.

The period of Moire fringes is determined from the least common multiple F of the number of beams n and the number of mirror planes q of the deflector, irrespective of the parameter of interlace-scanning. In this embodiment, n=2 and q=6, then F=6. Since p=0.02083 mm, this embodiment meets the condition of formula (3) as follows.

$$1/(F \cdot p) = 8.0012$$
$$\geq 4 \text{ line pairs per millimeter}$$

Accordingly, Moire fringes attributable to the jitter of deflector and the fluctuation of scanning line spacing are likely unnoticed by the human eye, and a high image quality is accomplished.

The dot patterns shown in FIG. 5 have a repetition period m·p and m is 3. The distortion of image caused by the jitter of deflector has a period q·p as shown in FIG. 7, and q is 6 in this embodiment. If the beam spacing varies against the design setting, the scanning line spacing will fluctuate in the period equal to the number of beams n irrespective of the parameter of interlace-scanning.

As mentioned previously, for the least common multiple G of the number of repetitions m of dot patterns in the slow scan direction, the number of mirror planes q of deflector and the number of beams n, Moire fringes arise with period G·p. The Moire fringes arise irrespective of the parameter of interlace-scanning as mentioned above.

This embodiment having the parameters n=2, m=3 and q=6, i.e., G=6, and p=0.02083 mm meets the condition of formula (4) as follows.

$$1/(G \cdot p) = 8.0012$$
$$\geq 4 \text{ line pairs per millimeter}$$

Accordingly, Moire fringes attributable to the fluctuation of the spacing of multi-beam scanning, the repetition period of dot patterns in the slow scan direction, and the jitter of deflector are likely unnoticed by the human eye, and a high image quality is accomplished.

EMBODIMENT 2

FIGS. 3A and 3B are a plan view and side view of the image writing apparatus based on the second embodiment of this invention. The constituents shown in these figures are identical to those shown in FIGS. 1A and 1B except for the laser array. This embodiment uses a light source of laser array 15 which emits four laser beams modulated independently.

Figure 4:
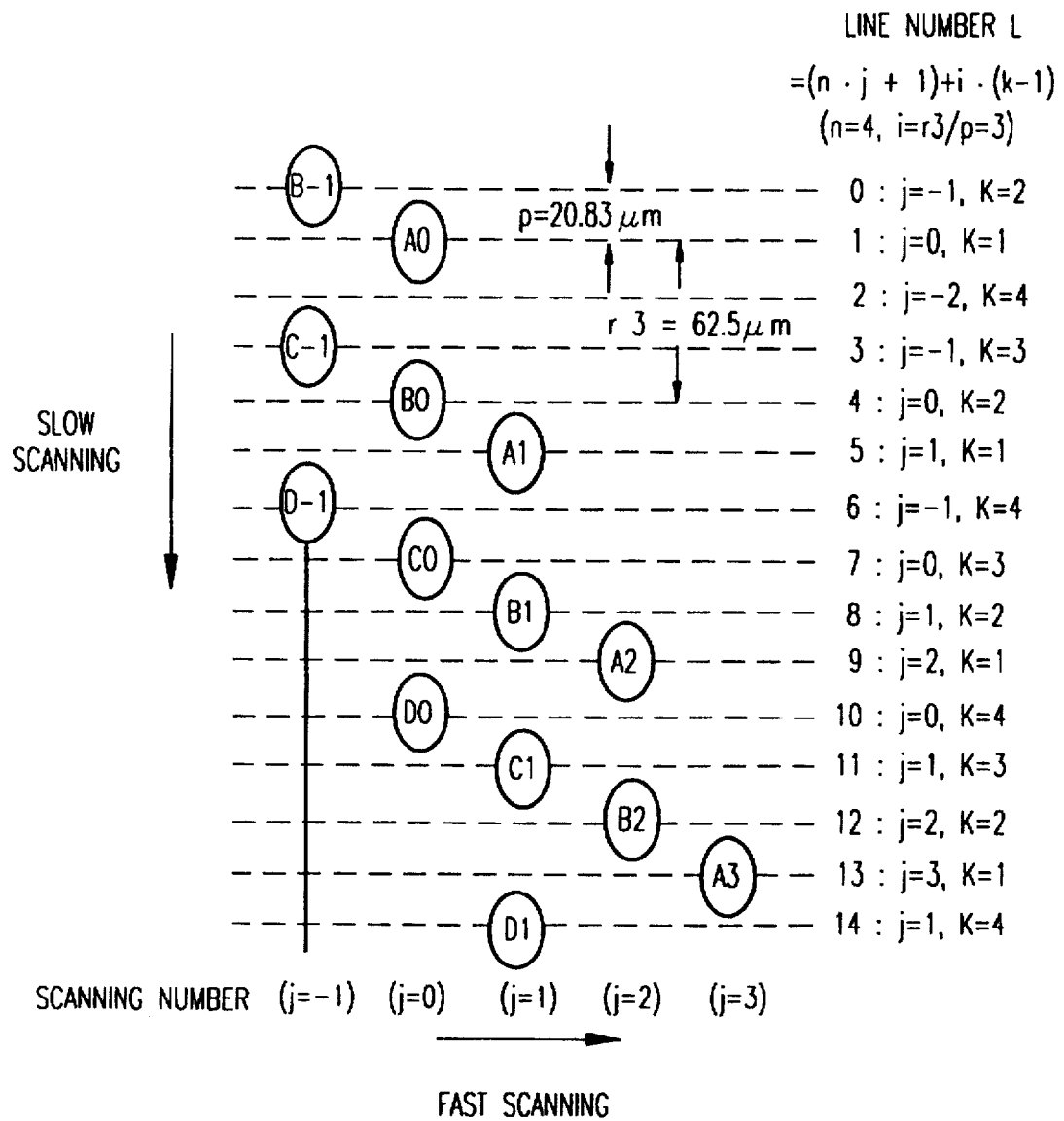
FIG. 4 is a diagram pertinent to the multi-beam scanning optical system of the second embodiment, showing the relation between the laser beam spots and the spacing of scanning lines on the scanning surface in case there is no deviation of spot position.

FIG. 4 shows the relation between the laser beam spots and the spacing of scanning lines on the scanning surface based on the multi-beam scanning optical system of this embodiment in case there is no deviation of spot position. The optical system has the same laser beam focusing system and design parameters as those of the first embodiment.

Referring to FIG. 3B, a collimator lens 2 has a focal length f1, a cylindrical lens (first optical device of slow scan direction) 4 has a focal length f2, an f-θ lens 7 has a focal length f3, and a cylindrical mirror 9 has a focal length f4. A first scanning optical system made up of the collimator lens 2, aperture 3 and cylindrical lens 4 disposed between the laser array 15 and deflector 6 has a lateral magnification in slow scan direction of β1, and a second scanning optical system including the f-θ lens 7 and cylindrical mirror 9 disposed between the deflector 6 and scanning surface 11 has a lateral magnification in slow scan direction of β2. A multi-beam scanning optical system composed of the first and second optical systems with the lateral magnifications β1 and β2 has a lateral magnification in slow scan direction of β.

Laser diodes LD1, LD2, LD3 and LD4 have a spacing r1 between adjacent laser beam emitting positions. Laser beams L1, L2, L3 and L4 emitted by these laser diodes go through the first scanning optical system with the lateral magnification β1, and are focused only in the slow scan direction on the deflector 6. The laser beams deflected by the deflector 6 go through the second scanning optical system with the lateral magnification β2, and are focused again on the scanning surface 11.

The multi-beam scanning optical system of this embodiment shown in FIGS. 3A and 3B has its design parameters set to be: r1=14 μm, f1=25.0 mm, f2=201.1 mm, β1=f2/f1= 8.042, β2=0.555, β=β1·β2=4.464, r3=r1·β=62.5 μm, and p=20.83 μm.

Accordingly, this multi-beam scanning optical system forms spots A, B, C and D of the laser beams L1, L2, L3 and L4 on the scanning surface 11 as shown in FIG. 4. The number of laser beams is four and the interlace-scanning period (i=r3/p) is three, i.e., n=4 and i=3.

The values of n and p of this embodiment meet the condition of formula (1) as follows.

$$1/(n \cdot p) = 1/(4 \times 0.02083)$$
$$= 12.0$$
$$\geq 4 \text{ line pairs per millimeter}$$

Consequently, the image writing apparatus of this embodiment has its unevenness of light level, which is caused by the multi-beam scanning, unnoticed by the human eye, and a high image quality is accomplished.

This embodiment uses a dot pattern as shown in FIG. 5 for displaying toned images. Dot patterns of FIG. 5 have a screen angle of 45° with respect to the slow scan direction and a period of repetition m·p in the slow scan direction, and accordingly m=3.

Figure 6:
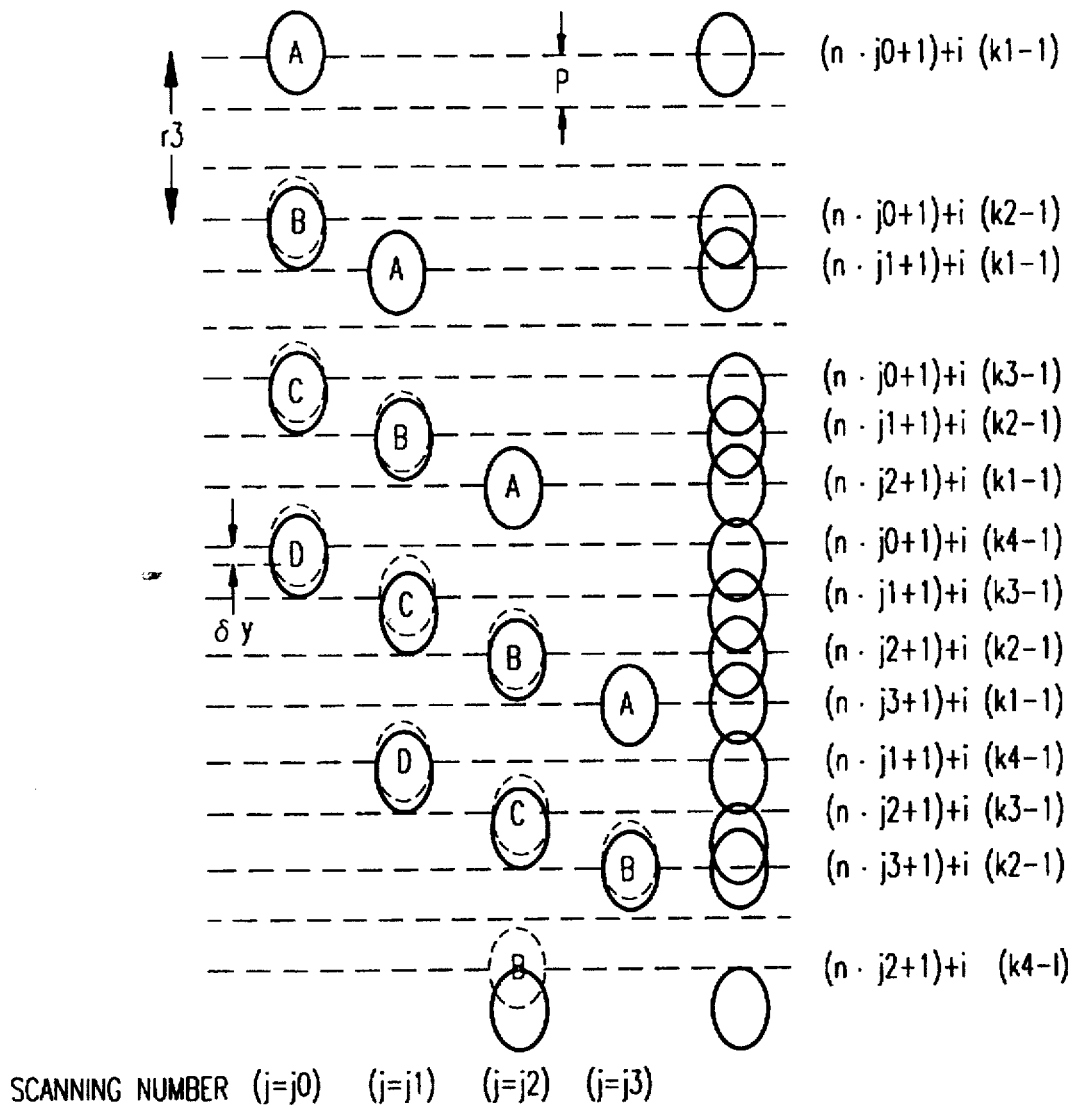
FIG. 6 is a diagram pertinent to the multi-beam scanning optical system of the second embodiment, showing the unevenness of exposure distribution in the slow scan direction in case the spot spacing on the scanning surface has error against the design setting.

In a multi-beam scanning optical system, if the beam spacing has error against the design setting as shown in FIG. 6, the spacing of scanning lines fluctuates in the repetition period equal to the number of beams n irrespective of the parameter of interlace-scanning, as mentioned previously. On this account, there arise Moire fringes of scanning lines having a period which is dependent on the repetition period of dot patterns in the slow scan direction and the number of beams n. The period of Moire fringes is determined from the least common multiple E of the number of beams n and the value m which determines the repetition of dot patterns in the slow scan direction, irrespective of the parameter of interlace-scanning. In this embodiment, n=4 and m=3, then E=12. Since p=0.02083 mm, this embodiment meets the condition of formula (2) as follows.

$$1/(E \cdot p) = 4.0006$$
$$\geq 4 \text{ line pairs per millimeter}$$

In consequence, when the image writing apparatus of this embodiment is used to display toned images, Moire fringes attributable to the fluctuation of line spacing of multi-beam scanning and the repetition period of dot patterns in the slow scan direction are likely unnoticed by the human eye, and a high image quality is accomplished.

The use of a deflector in a laser beam scanning optical system can create a distortion of image due to the fluctuation of beam position in the fast scan direction which is mainly caused by the plane distortion of the mirror. FIG. 7 demonstrates the output line image extending in the slow scan direction resulting from the use of a deflector having a plane distortion in a conventional single-beam scanning optical system. The image position fluctuates in the fast scan direction once every revolution of the polygonal mirror, and this phenomenon is called the deflector-causing jitter.

As shown in FIG. 6, in a multi-beam scanning optical system, if the beam spacing has error against the design setting, the spacing of scanning lines fluctuates in the repetition period equal to the number of beams n irrespective of the parameter of interlace-scanning. This situation gives rise to the emergence of Moire fringes attributable to the jitter of deflector and the fluctuation of scanning line spacing.

The period of Moire fringes is determined from the least common multiple F of the number of beams n and the number of mirror planes q of the deflector, irrespective of the parameter of interlace-scanning. In this embodiment, n=4 and q=6, then F=12. Since p=0.02083 mm, this embodiment meets the condition of formula (3) as follows.

$$1/(F \cdot p) = 4.0006$$
$$\geq 4 \text{ line pairs per millimeter}$$

Accordingly, Moire fringes attributable to the jitter of deflector and the fluctuation of scanning line spacing are likely unnoticed by the human eye, and a high image quality is accomplished.

The dot patterns shown in FIG. 5 have a repetition period m·p and m is 3. The distortion of image caused by the jitter of deflector has a period q·p as shown in FIG. 7, and q is 6 in this embodiment. If the beam spacing varies against the design setting as shown in FIG. 6, the scanning line spacing will fluctuate in the period equal to the number of beams n irrespective of the parameter of interlace-scanning.

As mentioned previously, for the least common multiple G of the number of repetitions m of dot patterns in the slow scan direction, the number of mirror planes q of deflector and the number of beams n, Moire fringes arise with period G·p. The Moire fringes arise irrespective of the parameter of interlace-scanning as mentioned above.

This embodiment having the parameters n=4, m=3 and q=6, i.e., G=12, and p=0.02083 mm meets the condition of formula (4) as follows.

$$1/(G \cdot p) = 4.0006$$
$$\geq 4 \text{ line pairs per millimeter}$$

Accordingly, Moire fringes attributable to the fluctuation of the spacing of multi-beam scanning, the repetition period of dot patterns in the slow scan direction, and the jitter of deflector are likely unnoticed by the human eye, and a high image quality is accomplished.

Although specific embodiments of this invention have been explained, the invention is not confined to these embodiments, but various design alterations may be made within the scope of this invention as described in the appended claims.

For example, it is possible to vary the setting of the parameters n, p, m and q while choosing concurrently the characteristics of optical elements, thereby designing a multi-beam scanning optical system having the value 1/(n·p), 1/(E·p), 1/(F·p) or 1/(G·p) greater than or equal to 4 line pairs per millimeter.

According to the multi-beam scanning optical system based on this invention as described above, in which the parameters n and p, or n, m and p, or n, q and p, or n, m, q and p are determined so that the 1/(n·p), 1/(E·p), 1/(F·p) or $1/(G \cdot p)$ takes a proper value greater than or equal to 4 line pairs per millimeter, it becomes possible to make the fluctuation of the laser beam spot position on the scanning surface, the unevenness of light level on the scanning surface, and the spatial frequency of Moire fringes arising from the error of profile of laser beam spot on the scanning surface all out of the resolution of the human eye.

Consequently, the multi-beam scanning optical system based on this invention can accomplish the high-quality image reproduction.

I claim:

1. An image writing apparatus comprising:

a laser array including a plurality of laser diodes modulated independently; and a multi-beam scanning optical system having a deflector which deflects a plurality of laser beams produced by said laser diodes and operating on the laser beams deflected by said deflector to scan different scanning lines on a scanning surface thereby to write an image on the scanning surface, wherein said multi-beam scanning optical system is designed such that a number of the plurality of laser beams n and a spacing of the scanning lines p resulting from the scanning of the laser beams meet the condition of formula:

$1/(n \cdot p) \geq 4$ line pairs per millimeter and wherein said multi-beam scanning optical system is designed for interlace-scanning such that the interlace-scanning period i, which is defined to be a spacing of adjoining beams r3 divided by p, and the number of laser beams n are prime natural numbers with each other.

2. An image writing apparatus according to claim 1, wherein said multi-beam scanning optical system is designed such that the interlace-scanning period i is greater than or equal to 2.

3. An image writing apparatus according to claim 1, wherein said multi-beam scanning optical system is designed such that the number of laser beams n is greater than or equal to 3.

4. An image writing apparatus according to any of claim 1, wherein said multi-beam scanning optical system is designed such that the number of laser beams n, the spacing of scanning lines p resulting from the scanning of the laser beams, a natural number m, where the period of repetitive patterns of image in the slow scan direction is equal to p multiplied by m, and the least common multiple E of m and n meet the condition of formula:

$1/(E \cdot p) \geq 4$ line pairs per millimeter

5. An image writing apparatus according to any of claim 1, wherein said multi-beam scanning optical system is designed such that the number of laser beams n, the spacing of scanning lines p resulting from the scanning of the laser beams, the number of deflection planes q of said deflector, and the least common multiple F of n and q meet the condition of formula:

$1/(F \cdot p) \geq 4$ line pairs per millimeter

6. An image writing apparatus according to any of claim 1, wherein said multi-beam scanning optical system is designed such that the number of laser beams n, the spacing of scanning lines p resulting from the scanning of the laser beams, the number of deflection planes q of said deflector, a natural number m, where the period of repetitive patterns of image is equal to p multiplied by m, and the least common multiple G of m, n and q meet the condition of formula:

$1/(G \cdot p) \geq 4$ line pairs per millimeter

7. An image writing apparatus according to claim 2, wherein said multi-beam scanning optical system is designed such that the interlace-scanning period i is greater than 2.

8. An image writing apparatus according to claim 3, wherein said multi-beam scanning optical system is designed such that the number of laser beams n is greater than 3.

* * * * *